(12) United States Patent
Tsutoh et al.

(10) Patent No.: US 7,119,352 B2
(45) Date of Patent: Oct. 10, 2006

(54) RADIATION IMAGE INFORMATION READING APPARATUS

(75) Inventors: Satoru Tsutoh, Minamiashigara (JP); Yasunori Ohta, Hadano (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 266 days.

(21) Appl. No.: 10/788,436

(22) Filed: Mar. 1, 2004

(65) Prior Publication Data
US 2004/0169152 A1  Sep. 2, 2004

(30) Foreign Application Priority Data
Feb. 28, 2003  (JP) .............................. 2003-054761

(51) Int. Cl.
*G03B 42/08* (2006.01)
(52) U.S. Cl. ..................................................... 250/589
(58) Field of Classification Search ................ 250/588, 250/589, 590
See application file for complete search history.

(56) References Cited

U.S. PATENT DOCUMENTS 4,908,514 A * 3/1990 Bauer et al. ................ 250/589
5,340,995 A   8/1994 Verbeke et al.
6,346,714 B1  2/2002 Muller et al.
6,781,144 B1 * 8/2004 Yonekawa ................... 250/589

FOREIGN PATENT DOCUMENTS

| JP | 6-43565 A | 2/1994 |
|---|---|---|
| JP | 2001-503880 A | 3/2001 |
| JP | 2002-156716 A | 5/2002 |

* cited by examiner

*Primary Examiner*—Constantine Hannaher
(74) *Attorney, Agent, or Firm*—Sughrue Mion, PLLC

(57) ABSTRACT

A cassette that is detected as being in an abnormally loaded state by a cassette loader is fed through a first processor, a second processor, a third processor, and a fourth processor to a fifth processor, and then discharged into a cassette storage unit. Similarly, a cassette which is detected as failing to eject a stimulable phosphor panel by the second processor is also discharged into the cassette storage unit. A cassette in a normal state ejects a stimulable phosphor panel in the second processor, and the ejected stimulable phosphor panel is processed in a main unit. The processed stimulable phosphor panel is stored back into the cassette, which is then unloaded into a cassette unloader.

16 Claims, 15 Drawing Sheets

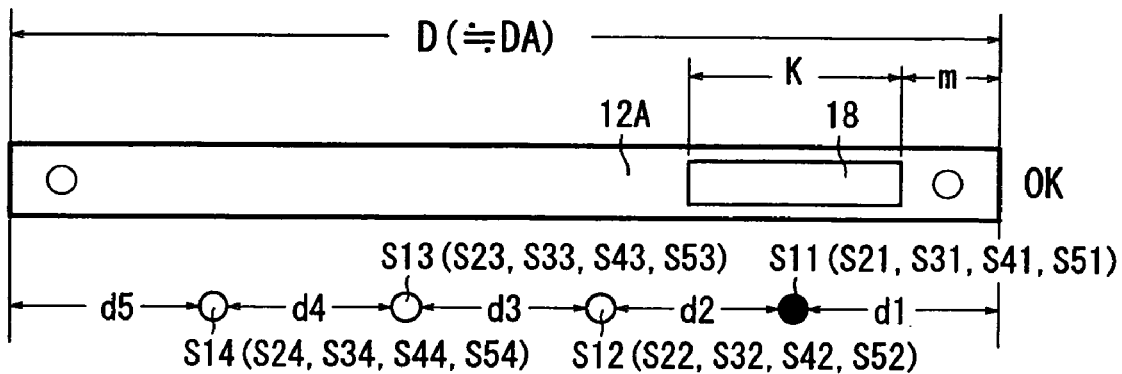
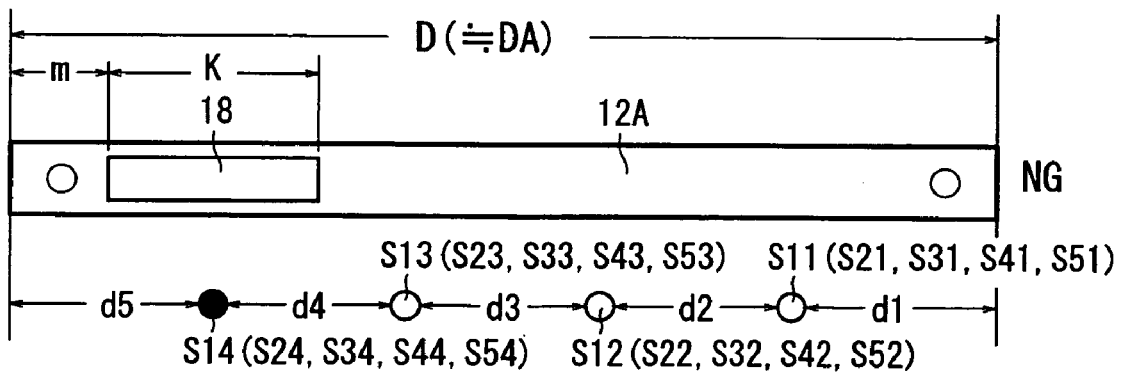

RADIATION IMAGE INFORMATION READING APPARATUS

BACKGROUND OF THE INVENTION

1. Field of the Invention

The present invention relates to a radiation image information reading apparatus for reading radiation image information stored in a stimulable phosphor panel that is held in a cassette and thereafter erasing remaining radiation image information stored from the stimulable phosphor panel.

2. Description of the Related Art

There are known radiation image information reading apparatus that employ a stimulable phosphor panel which stores a part of radiation energy applied thereto and, when subsequently exposed to applied stimulating rays such as visible light or the like, emits light in proportion to the stored radiation energy.

The radiation image information reading apparatus have a cassette loading unit for loading a cassette which holds a stimulable phosphor panel that is storing the radiation image information of a subject such as a human body or the like, a reading unit for applying stimulating rays to the stimulable phosphor panel to read the stored radiation image information therefrom, and an erasure unit for applying erasing light to the stimulable phosphor panel from which the radiation image information has been read to erase remaining radiation image information from the stimulable phosphor panel. After the remaining radiation image information has been erased, the stimulable phosphor panel is held in the cassette and discharged from the radiation image information reading apparatus for reuse (see Japanese Laid-Open Patent Publications Nos. 2002-156716, 6-43565, and 2001-503880 for details).

The stimulable phosphor panel comprises a support and a stimulable phosphor layer disposed on the support for recording radiation image information therein. In order to obtain desired light emitted from the stimulable phosphor panel, it is necessary that the cassette holding the stimulable phosphor panel therein be properly faced and loaded. In addition, the cassette should also properly be oriented and loaded to allow the stimulable phosphor panel to be removed from the cassette or to read the stored radiation image information in a correct orientation from the stimulable phosphor panel.

According to the radiation image information reading apparatus disclosed in Japanese Laid-Open Patent Publication No. 2002-156716, a code storage element is disposed on the cassette and a code reading means for reading a code stored by the code storage element is disposed in the cassette loading unit. If the code reading means fails to read a code from the code storage element or the code reading means reads an unidentifiable code from the code storage element, then it is judged that the cassette is loaded in error, followed by the display of an error message, and the cassette is prevented from being further introduced into the radiation image information reading apparatus.

When a cassette loading error is detected, the cassette will not be introduced into the radiation image information reading apparatus and will not be processed unless the operator takes some action to remedy the fault. The radiation image information reading apparatus disclosed in Japanese Laid-Open Patent Publication Nos. 6-43565 and 2001-503880 is not arranged to detect how the cassette is loaded. Therefore, if the cassette is loaded in error, then any processing on the cassette is interrupted or the cassette is wrongly processed. At any rate, unless the operator corrects the improperly loaded state of the cassette, a time loss tends to be caused by the interruption of the cassette processing or the wrong processing of the cassette.

SUMMARY OF THE INVENTION

It is a general object of the present invention to provide a radiation image information reading apparatus which is capable of retracting a cassette in an abnormal state and efficiently processing a cassette in a normal state.

A major object of the present invention is to provide a radiation image information reading apparatus which is capable of classifying and processing a cassette in an abnormal state and a cassette in a normal state.

Another object of the present invention is to provide a radiation image information reading apparatus which is capable of successively processing a plurality of cassettes which may possibly include a cassette in an abnormal state.

Still another object of the present invention is to provide a radiation image information reading apparatus which is capable of retracting a cassette holding a stimulable phosphor panel in an abnormal state and efficiently processing a cassette holding a stimulable phosphor panel in a normal state.

According to the present invention, when an abnormal state of a cassette is detected by a detector, a discharging mechanism stores the cassette into an abnormal cassette storage unit. Therefore, a next cassette out of a plurality of cassettes loaded in a cassette loader can quickly be supplied for continued processing without being obstructed by the cassette that is detected as being in the abnormal state.

An abnormal state of a cassette may be an abnormally loaded state of the cassette in the cassette loader, an abnormally registered state of the cassette, or an ejection failure of a stimulable phosphor panel stored in the cassette.

The abnormally loaded state of the cassette represents a state in which the cassette is loaded while being wrongly faced, loaded upside down, or loaded out of a desired posture. If a cassette is in such an abnormally loaded state, then the cassette may not be introduced into the radiation image information reading apparatus, or an appropriate reading process or erasing process may not be performed on the stimulable phosphor panel stored in the cassette. The detector can detect an abnormally loaded state of a cassette because a certain area of the cassette in the abnormally loaded state is not placed in a predetermined position in the cassette loader.

The abnormally registered state of the cassette represents a state in which the cassette loader is loaded with an unregistered cassette storing either a stimulable phosphor panel prior to the recording of radiation image information therein or a stimulable phosphor panel from which radiation image information has already been read and remaining radiation image information has been erased, or with a cassette that is different from registered cassettes storing stimulable phosphor panels to be read. If a cassette is in such an abnormally registered state, then desired radiation image information cannot be acquired or radiation image information cannot be processed normally. According to the present invention, a bar code or an IC chip holding identification information for identifying a stimulable phosphor panel stored in a cassette or identifying such a cassette itself is attached to the cassette, and the radiation image information reading apparatus acquires imaging information of stimulable phosphor panels stored in cassettes to be used for subjects or patients who have made a reservation for capturing radiation image information from an intra-hospital network such as an HIS (Hospital Information System), an RIS (Radiology Information System), or the like, and registers the acquired imaging information in relation to the identification information. The radiation image information reading apparatus then detects a registered state of a loaded cassette from the identification information detected by the detector from the bar code or the IC chip on the cassette loaded in the cassette loader and the imaging information registered in the radiation image information reading apparatus, thereby detecting whether the registered state of the loaded cassette is normal or abnormal.

The ejection failure of the stimulable phosphor panel stored in the cassette represents a state in which a cassette is faulty and is unable to eject a stimulable phosphor panel or a state in which a lid on a cassette cannot be opened. If a stimulable phosphor panel stored in a cassette suffers such an ejection failure, then an appropriate reading process or erasing process cannot be performed on the stimulable phosphor panel stored in the cassette. The detector can detect an ejection failure based on whether a stimulable phosphor panel is ejected from a cassette or not or whether a lid on a cassette is opened or not.

The abnormal cassette storage unit for storing a cassette that is detected as being in an abnormal state may be disposed in the cassette loader. With this arrangement, an inlet member for introducing a cassette into the radiation image information reading apparatus is disposed in the cassette loader, and a wall movable from the inlet member is also disposed in the cassette loader. When an abnormal state of a cassette is detected by the detector, the wall as it holds the cassette thus detected is moved to store the cassette into the abnormal cassette storage unit.

The cassette loader with the inlet member disposed therein may have an inclined bottom panel, and the wall may be arranged so as to be movable downwardly along the inclined bottom panel. This arrangement makes it possible to introduce a cassette in a normal state through the inlet member into the radiation image information reading apparatus, and allows a cassette detected as being in an abnormal state to be held by the wall and moved by gravity into the abnormal cassette storage unit.

Alternatively, a cassette may be introduced into the radiation image information reading apparatus regardless of whether the cassette is in a normal state or an abnormal state. If the cassette is detected as being in an abnormal state, then it may be stored into the abnormal cassette storage unit disposed within the radiation image information reading apparatus by the discharging mechanism, or stored into the abnormal cassette storage unit disposed outside of the radiation image information reading apparatus independently of the cassette loader, so that a cassette in a normal state can continuously be processed in the radiation image information reading apparatus.

A normal cassette storage unit may be provided separately from the abnormal cassette storage unit, so that those cassettes detected as being in an abnormal state and those cassettes detected as being in a normal state can separately be stored in the abnormal cassette storage unit and the normal cassette storage unit, respectively.

The cassette loader may be loaded with a plurality of cassettes and each of the cassettes is detected for its state. With this arrangement, a cassette detected as being in an abnormal state may be stored in the abnormal cassette storage unit, whereas a cassette detected as being in a normal state may efficiently be processed continuously. After having loaded a plurality of cassettes in the cassette loader, therefore, the operator is not restrained to work at the cassette loader, but may be available to do other work.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a view illustrative of a loaded state detecting process in the cassette loading unit of the radiation image information reading apparatus according to the first embodiment;

FIG. 7 is a view illustrative of the loaded state detecting process in the cassette loading unit of the radiation image information reading apparatus according to the first embodiment;

DESCRIPTION OF THE PREFERRED EMBODIMENTS

Figure 1:
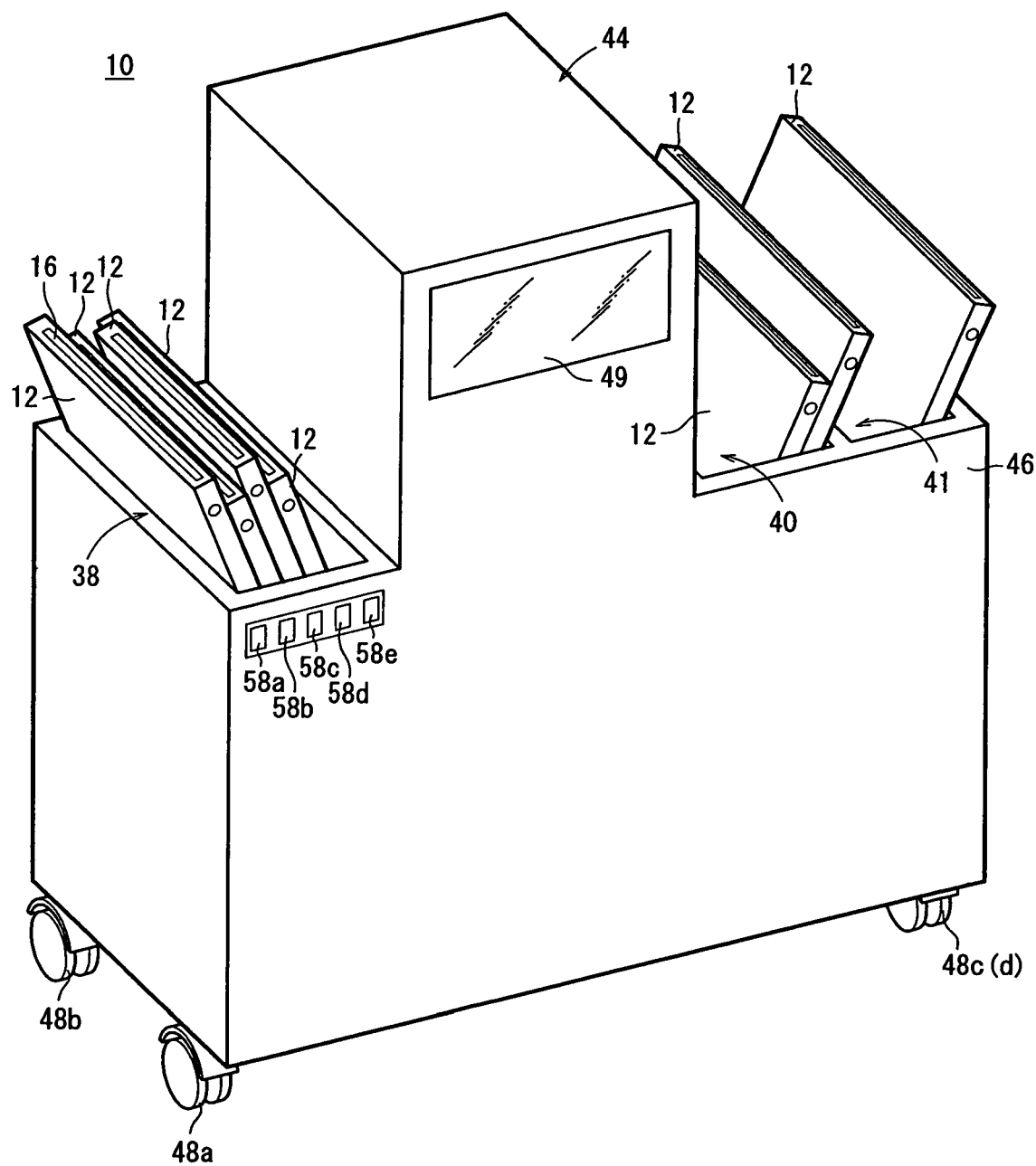
FIG. 1 is a perspective view of a radiation image information reading apparatus according to a first embodiment of the present invention.
Figure 2:
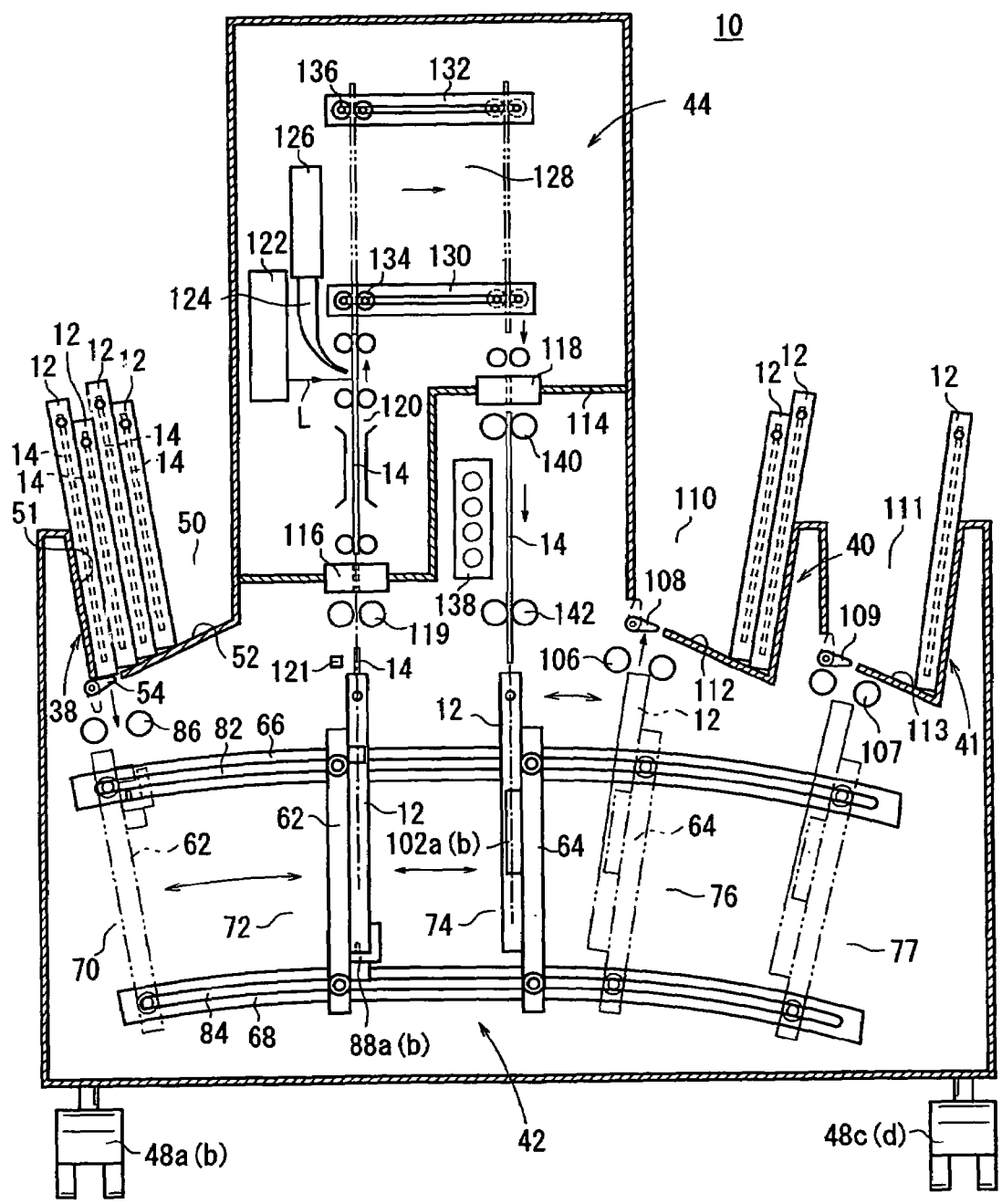
FIG. 2 is a vertical cross-sectional view of the radiation image information reading apparatus according to the first embodiment.

FIG. 1 shows in perspective a radiation image information reading apparatus 10 according to a first embodiment of the present invention, and FIG. 2 shows in vertical cross section the radiation image information reading apparatus 10.

Figure 3:
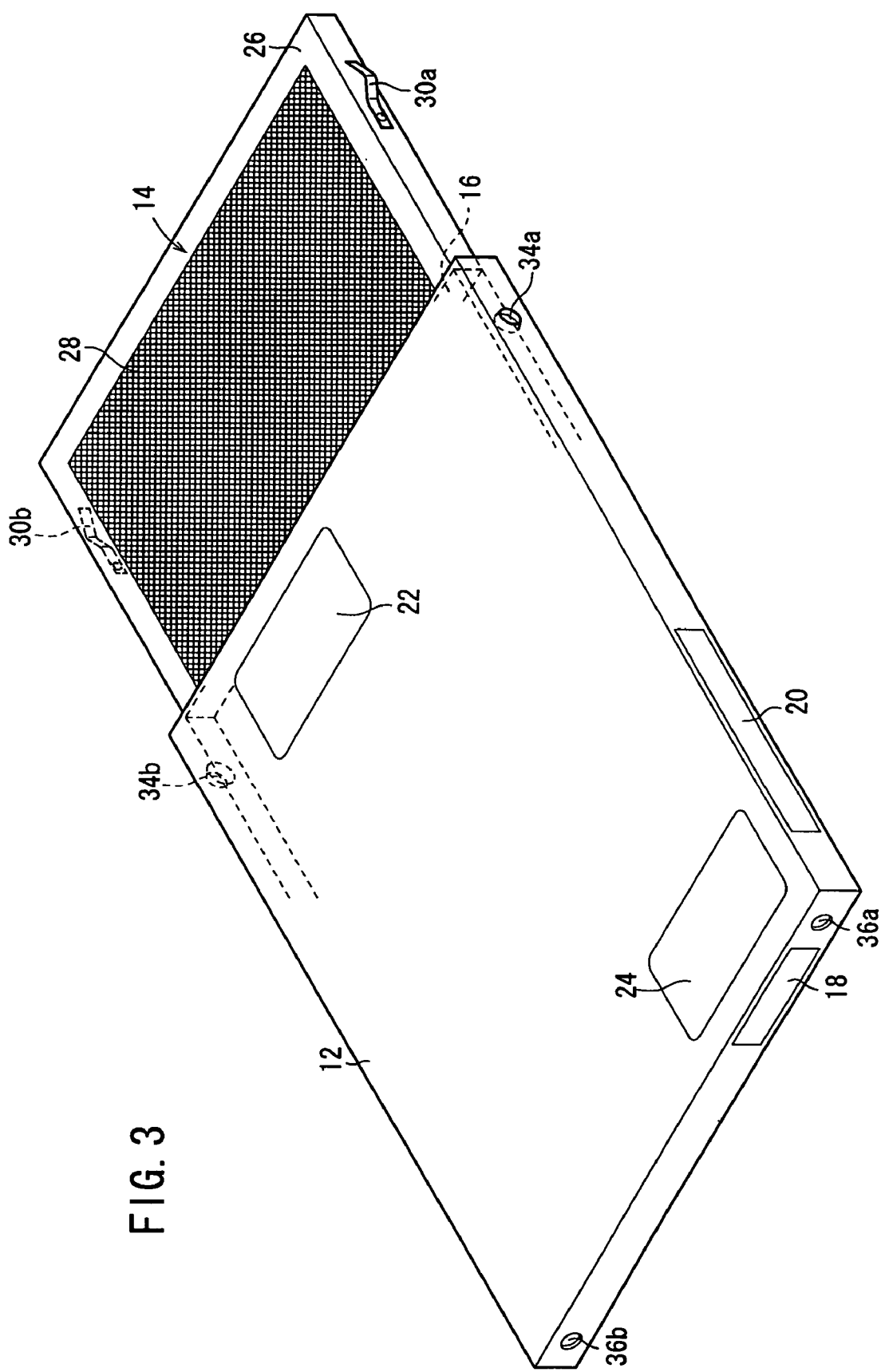
FIG. 3 is a perspective view of a cassette to be loaded into the radiation image information reading apparatus according to the first embodiment.

The radiation image information reading apparatus 10 has a function to read radiation image information recorded in a stimulable phosphor panel 14 that is stored in a cassette 12 shown in FIG. 3, erase remaining radiation image information recorded from the stimulable phosphor panel 14, place the stimulable phosphor panel 14 back into the cassette 12, and discharge the stimulable phosphor panel 14 stored in the cassette 12.

As shown in FIG. 3, the cassette 12 has an opening 16 defined in an end thereof for inserting the stimulable phosphor panel 14 therethrough into the cassette 12. The cassette 12 also has a reflective marker 18 disposed in a certain location on the other end thereof for detecting a loaded state of the cassette 12 in the radiation image information reading apparatus 10. The cassette 12 also has identifiers 20, 22 such as bar codes, IC chips, or the like on a side face of the cassette 12 and a front face thereof near the opening 16. The identifiers 20, 22 record therein managing identification information for specifying the size of the cassette 12 and the stimulable phosphor panel 14 that is stored in the cassette 12. The cassette 12 further has an indicator 24 disposed on the front face thereof near the reflective marker 18. The indicator 24 indicates the name of the patient whose radiation image information has been recorded in the stimulable phosphor panel 14, the imaged body region of the patient, etc.

The stimulable phosphor panel 14 stored in the cassette 12 may be in the form of a hard panel comprising a support base 26 made of a hard material such as glass or the like and a stimulable phosphor layer 28 having a stimulable phosphor in the shape of columns evaporated thereon. The stimulable phosphor layer 28 may be formed by a vacuum evaporation process which heats a stimulable phosphor in a vacuum container to evaporate the stimulable phosphor and deposit same on the support base 26, a sputtering process, a CVD (Chemical Vapor Deposition) process, or an ion plating process. In the stimulable phosphor layer 28 thus formed, the stimulable phosphor is in the form of columns extending substantially perpendicularly to the plane of the stimulable phosphor panel 14. The columns of the stimulable phosphor layer 28 are optically independent of each other, highly sensitive to radiations applied thereto, can lower the granularity of images recorded therein, and can reduce the dispersion of stimulating light for reproducing clear images.

Locking springs 30a, 30b are mounted respectively on opposite sides of the stimulable phosphor panel 14. When the stimulable phosphor panel 14 is inserted into the cassette 12 through the opening 16, the locking springs 30a, 30b are locked in respective holes 34a, 34b that are defined in respective side walls of the cassette 12. The stimulable phosphor panel 14 that has fully been inserted into the cassette 12 is locked in place by the locking springs 30a, 30b against accidental removal from the cassette 12. The inserted stimulable phosphor panel 14 can be released from the cassette 12 by unlock pins (described later on) which are pushed respectively into the holes 34a, 34b to press the locking springs 30a, 30b out of the holes 34a, 34b. The cassette 12 also has holes 36a, 36b defined respective at opposite ends of the end face thereof where the reflective marker 18 is positioned. Eject pins (described later on) are inserted into the holes 36a, 36b to eject the stimulable phosphor panel 14 out of the cassette 12.

As shown in FIG. 2, the radiation image information reading apparatus 10 comprises a cassette loader 38 for loading a plurality of cassettes 12, a cassette unloader 40 (normal cassette storage unit) for unloading a plurality of cassettes 12 which have been processed in a normal state, a cassette storage unit (abnormal cassette storage unit) 41 for storing a cassette 12 that has been detected as in an abnormal state, a cassette feeder 42 for feeding a cassette 12 between the cassette loader 38, the cassette unloader 40, and the cassette storage unit 41, and a main unit 44 for reading recorded radiation image information from the stimulable phosphor panel 14 ejected from a cassette 12 in a normal state and erasing remaining radiation image information from the stimulable phosphor panel 14.

The cassette loader 38 and the cassette unloader 40 are positioned respectively forward and rearward of the main unit 44. The cassette storage unit 41 is disposed adjacent to the cassette unloader 40. The radiation image information reading apparatus 10 has a casing 46 enclosing the components thereof, and is movable on casters 48a through 48d. A display unit 49 for displaying various items of information including operating states of the radiation image information reading apparatus 10 is mounted on a side panel of the casing 46.

Figure 4:
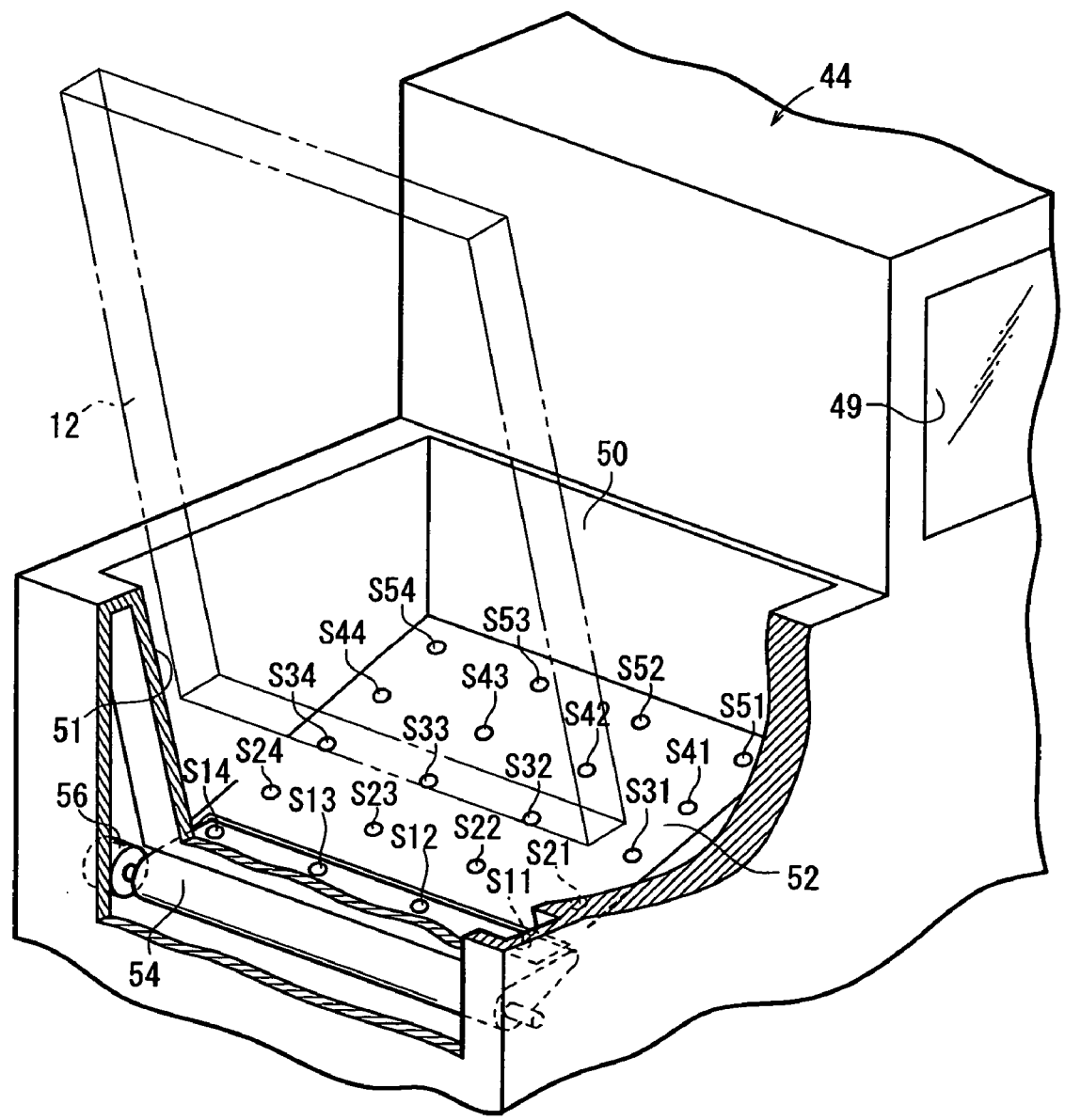
FIG. 4 is a fragmentary perspective view, partly broken away, of a cassette loading unit of the radiation image information reading apparatus according to the first embodiment.

The cassette loader 38 has a loading box 50 which is capable of simultaneously loading a plurality of cassettes 12 having various sizes. As shown in FIG. 4, the loading box 50 has a bottom panel 52 inclined downwardly in a direction away from the main unit 44. The inclined bottom panel 52 has an opening defined in its lowermost portion and normally closed by a lid 54 disposed therein. When the opening is opened by the lid 54, a cassette 12 in the loading box 50 is introduced therethrough into the radiation image information reading apparatus 10. The loading box 50 which holds cassettes 12 therein has a side wall 51 that is inclined a certain angle in a direction away from the main unit 44 for allowing cassettes 12 to be loaded stably from the loading box 50 into the radiation image information reading apparatus 10.

A plurality of sensors S11 through S54 for detecting loaded states of cassettes 12 in the loading box 50 are mounted on the bottom panel 52 and the lid 54. The sensors S11 through S54 detect reflected light from the reflective markers 18 disposed on the ends of cassettes 12 in the loading box 50. The sensors S11 through S14 are disposed at predetermined intervals, to be described later on, on the lid 54 for detecting a loaded state of a cassette 12 that is placed on the lid 54. The sets of sensors S21 through S24, S31 through S34, S41 through S44, and S51 through S54 are disposed on the bottom panel 52 for detecting loaded states of cassettes 12 that are placed on the bottom panel 52 in juxtaposed relation to the cassette 12 that is placed on the lid 54.

The lid 54 is opened by a lid opening/closing motor 56 for introducing a cassette 12 from the loading box 50 into the radiation image information reading apparatus 10. As shown in FIG. 1, indicators 58a through 58e for indicating loaded states of respective cassettes 12 that are placed in the loading box 50 are disposed on a side wall of the cassette loader 38.

The cassette feeder 42 has a first processing mechanism 62 and a second processing mechanism 64 (discharging mechanism) for holding a cassette 12 supplied from the cassette loader 38. The first processing mechanism 62 is guided by upper and lower guide members 66, 68 and reciprocally movable from a first processor 70 disposed below the cassette loader 38 through a second processor 72 to a third processor 74. The second processing mechanism 64 is guided by the upper and lower guide members 66, 68 and reciprocally movable from the third processor 74 through a fourth processor 76 disposed below the cassette unloader 40 to a fifth processor 77 disposed below the cassette storage unit 41.

Figure 5:
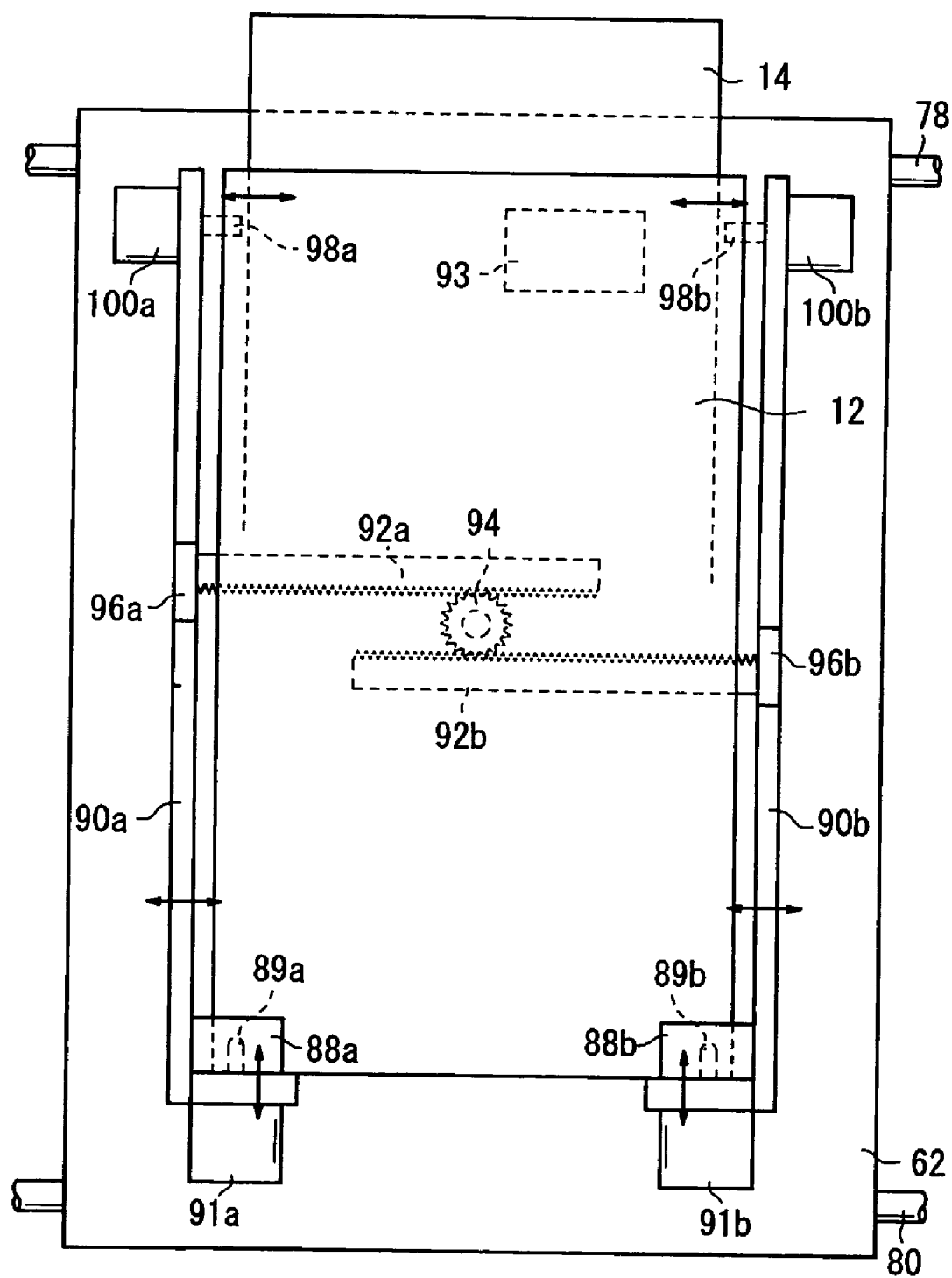
FIG. 5 is a view of a first processing mechanism in the radiation image information reading apparatus according to the first embodiment.

As shown in FIG. 5, the first processing mechanism 62 has upper and lower portions movably supported in guide grooves 82, 84 defined respectively in the upper and lower guide members 66, 68 by support shafts 78, 80. The first processing mechanism 62 also has support members 88a, 88b for supporting the lower end of a cassette 12 which is supplied from the cassette loader 38 by nip rollers 86. On the support members 88a, 88b, there are disposed respective solenoids 91a, 91b having respective ejector pins 89a, 89b that can selectively be projected and retracted by the solenoids 91a, 91b. When the ejector pins 89a, 89b are projected, they are inserted into the respective holes 36a, 36b defined in the end of the cassette 12 to eject the stimulable phosphor panel 14 out of the cassette 12. The first processing mechanism 62 also has a reader 93 for reading the identification information of the cassette 12 which is recorded in the identifier 22, such as a bar code, an IC chip, or the like, on the cassette 12 that is supplied from the cassette loader 38.

The support members 88a, 88b with the solenoids 91a, 91b disposed thereon are movable vertically along joint plates 90a, 90b which extend substantially vertically along the first processing mechanism 62. The joint plates 90a, 90b have horizontally extending racks 92a, 92b, respectively, held in mesh with a pinion gear 94 rotatably mounted on the first processing mechanism 62. The joint plates 90a, 90b have respective shift plates 96a, 96b disposed substantially centrally therein and coupled to the respective racks 92a, 92b. When the pinion gear 94 is rotated, the racks 92a, 92b are horizontally displaced to move the joint plates 90a, 90b toward each other, causing the shift plates 96a, 96b to shift the cassette 12 supported by the support members 88a, 88b to a central position on the first processing mechanism 62.

Solenoids 10a, 100b having respective unlock pins 98a, 98b are mounted respectively on the upper ends of the joint plates 90a, 90b. The unlock pins 98a, 98b can selectively be projected and retracted by the solenoids 10a, 100b. When the unlock pins 98a, 98b are projected, they are inserted into the respective holes 34a, 34b defined in the respective side faces of the cassette 12 to unlock the stimulable phosphor panel 14 from the cassette 12.

The second processing mechanism 64 has vertically movable grip plates 102a, 102b for griping opposite sides of a cassette 12 that is fed to the third processor 74 by the first processing mechanism 62. The grip plates 102a, 102b are positioned in a region that does not interfere with the shift plates 96a, 96b of the first processing mechanism 62.

The cassette unloader 40 has a storage box 110 for storing a plurality of cassettes 12 in a normal state that are discharged from the fourth processor 76 through a lid 108 by nip rollers 106. The storage box 110 has an inclined bottom panel 112 as with the loading box 50 of the cassette loader 38.

The cassette storage unit 41 is disposed adjacent to the cassette unloader 40, and has a storage box 111 for storing a plurality of cassettes 12 which have been detected as being in an abnormal state that are discharged from the fifth processor 77 through a lid 109 by nip rollers 107. The storage box 111 has an inclined bottom panel 113 as with the cassette loader 38 and the cassette unloader 40.

The main unit 44 is isolated from the cassette feeder 42 disposed therebelow by a partition wall 114. The main unit 44 is shielded against entry of light by the partition wall 114 that has shutter mechanisms 116, 118 through which a stimulable phosphor panel 14 can be taken into and out of the main unit 44. Each of the shutter mechanisms 116, 118 may comprise a shutter mechanism which is selectively opened and closed when a stimulable phosphor panel 14 moves into and out of the main unit 44, or a light-shielding member which slidably contacts a stimulable phosphor panel 14 as it moves into and out of the main unit 44.

Between the shutter mechanism 116 and the second processor 72, there are disposed nip rollers 119 for supplying a stimulable phosphor panel 14 to the main unit 44. A detector 121 for detecting a stimulable phosphor panel 14 that is removed from a cassette 12 is disposed near the nip rollers 119. The detector 121 may comprise an infrared sensor, for example.

A linear reading feed path 120 extending substantially upwardly is disposed in the main unit 44. The main unit 44 accommodates therein a stimulating light scanner 122 disposed substantially centrally at the linear reading feed path 120 for applying a stimulating light beam L, which comprises a laser beam, as it sweeps in a main scanning direction to a stimulable phosphor panel 14 which is being fed in an auxiliary scanning direction that extends perpendicularly to the main scanning direction. A light guide 124 for collecting light emitted from the stimulable phosphor panel 14 has an end positioned closely to a main scanning line on the stimulable phosphor panel 14 by the stimulating light beam L. The other end of the light guide 124 is connected to a photoelectric transducer 126 (reading unit) such as a photomultiplier or the like for converting light collected by the light guide 124 into an electric signal.

A panel feeder 128 for substantially horizontally feeding a stimulable phosphor panel 14 from which radiation image information has been read has an end disposed at an upper portion of the linear reading feed path 120. The panel feeder 128 has lower and upper pairs of nip rollers 134, 136 that are guided by respective guide members 130, 132 for horizontal movement therealong.

The shutter mechanism 118 is disposed below an opposite end of the panel feeder 128, i.e., is disposed in a position that is spaced from the linear reading feed path 120 toward the cassette unloader 40. An erasure unit 138 for erasing remaining radiation image information on a stimulable phosphor panel 14 is disposed between the shutter mechanism 118 and the third processor 74 of the cassette feeder 42. The erasure unit 138 has a plurality of light sources such as halogen lamps or the like for emitting erasure light. Pairs of nip rollers 140, 142 are disposed above and below the erasure unit 138 for supplying a stimulable phosphor panel 14 from the main unit 44 to the cassette feeder 42.

The radiation image information reading apparatus 10 according to the first embodiment of the present invention is basically constructed as described above. Now, operation of the radiation image information reading apparatus 10 will be described below.

The operator loads a plurality of cassettes 12 which store respective stimulable phosphor panels 14 with radiation image information recorded therein into the loading box 50 of the cassette loader 38. The loading box 50 can simultaneously be loaded with a plurality of cassettes 12 having different sizes. According to the present embodiment, the loading box 50 can simultaneously be loaded with a maximum of five cassettes 12.

When the cassettes 12 are loaded into the loading box 50, the sensors S11 through S54 on the bottom panel 52 of the loading box 50 detect respective loaded states of the cassettes 12. The indicators 58a through 58e indicate the loaded states of the respective cassettes 12 based on the detected information from the sensors S11 through S54.

A process of detecting a loaded state of a cassette 12 will be described below with reference to FIGS. 6 through 11.

It is assumed that there are two types of cassettes 12, i.e., a larger cassette 12A having a width DA (see FIGS. 6 and 7) and a smaller cassette 12B having a width DB (see FIGS. 8 through 11) (DA>DB), and the loading box 50 has a width D which is substantially the same as the width DA of the larger cassette 12A. It is also assumed that the reflective markers 18 on the ends of the larger and smaller cassettes 12A, 12B have a width K, and have an end spaced from the nearest side of the larger and smaller cassettes 12A, 12B by a distance m. It is further assumed that the sensors S11 through S54 on the bottom panel 52 of the loading box 50 are spaced from the inner surfaces of the opposite side walls of the loading box 50 and also from each other by distances d1 through d5.

FIG. 6 shows the larger cassette 12A loaded into the loading box 50 with the identifier 22 facing the side wall 51 and with the opening 16 facing upwardly. In this case, only the sensor S11 (S21, S31, S41, S51) detects the reflective marker 18 if m<d1<m+K<d1+d2. When the sensor S11 (S21, S31, S41, S51) detects the reflective marker 18, the larger cassette 12A is detected as being loaded normally, and one of the indicators 58a through 58e which corresponds to the position where the larger cassette 12A is loaded in the loading box 50 is turned on to emit green light, for example, indicating a normally loaded state of the larger cassette 12A.

FIG. 7 shows the larger cassette 12A loaded into the loading box 50 with the identifier 22 facing the main unit 44. In this case, only the sensor S14 (S24, S34, S44, S54) detects the reflective marker 18 if m<d5<m+K<d5+d4. When the sensor S14 (S24, S34, S44, S54) detects the reflective marker 18, the larger cassette 12A is detected as being loaded abnormally, and one of the indicators 58a through 58e which corresponds to the position where the larger cassette 12A is loaded in the loading box 50 is turned on to emit red light, for example, indicating an abnormally loaded state of the larger cassette 12A.

Figure 8:
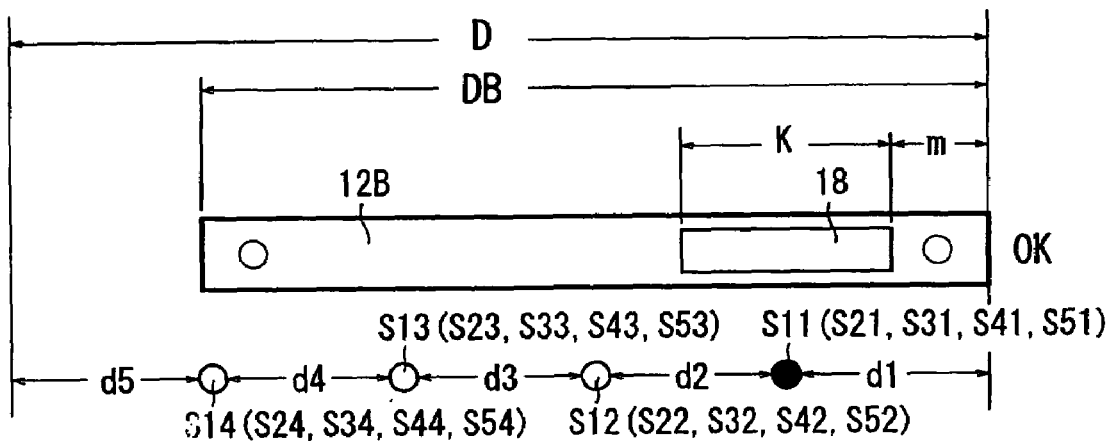
FIG. 8 is a view illustrative of the loaded state detecting process in the cassette loading unit of the radiation image information reading apparatus according to the first embodiment.

FIG. 8 shows the smaller cassette 12B loaded into the loading box 50 with the identifier 22 facing the side wall 51, the smaller cassette 12B being positioned closely to the indicators 58a through 58e. In this case, as is the case with the larger cassette 12A shown in FIG. 6, one of the indicators 58a through 58e which corresponds to the position where the smaller cassette 12B is loaded in the loading box 50 is turned on to emit green light, for example, indicating a normally loaded state of the smaller cassette 12B.

Figure 9:
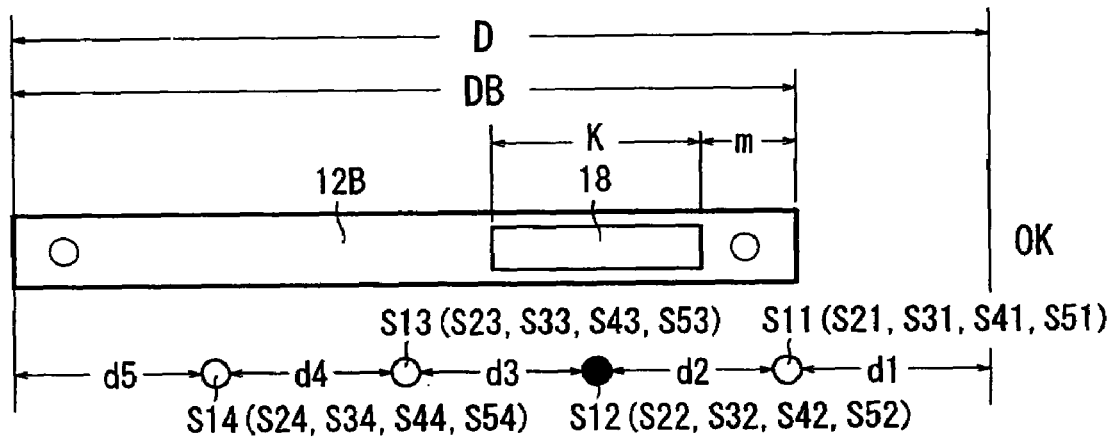
FIG. 9 is a view illustrative of the loaded state detecting process in the cassette loading unit of the radiation image information reading apparatus according to the first embodiment.

FIG. 9 shows the smaller cassette 12B loaded into the loading box 50 with the identifier 22 facing the side wall 51, the smaller cassette 12B being positioned remotely from the indicators 58a through 58e. In this case, only the sensor S12 (S22, S32, S42, S52) detects the reflective marker 18 if D−DB+m<d1+d2<D−DB+m+K<d1+d2 +d3. When the sensor S12 (S22, S32, S42, S52) detects the reflective marker 18, the smaller cassette 12B is detected as being loaded normally, and one of the indicators 58a through 58e which corresponds to the position where the smaller cassette 12B is loaded in the loading box 50 is turned on to emit green light, for example, indicating a normally loaded state of the smaller cassette 12B.

If the width K of the reflective marker 18 is set to a width larger than d2 (d2<K) and at least one of the sensor S11 (S21, S31, S41, S51) and the sensor S12 (S22, S32, S42, S52) is arranged to be able to detect the reflective marker 18, then the smaller cassette 12B can reliably be detected as being normally loaded in the loading box 50 even when the smaller cassette 12B is loaded in any desired position in the loading box 50.

Figure 10:
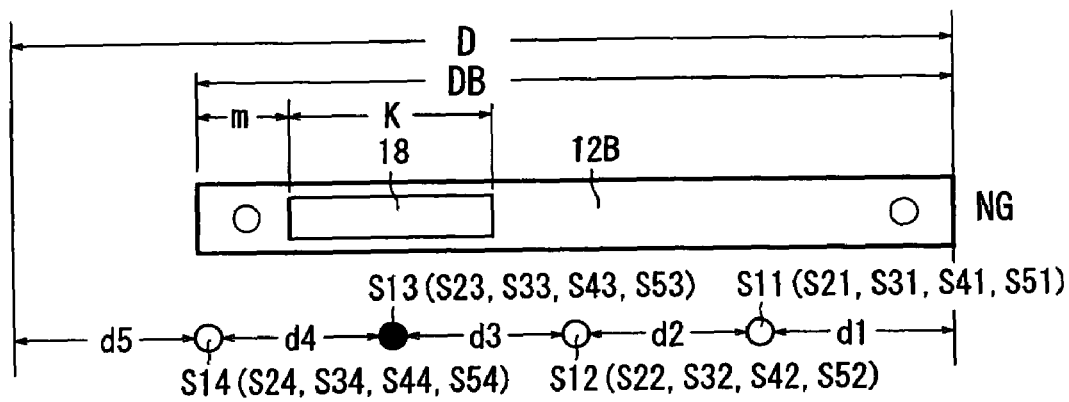
FIG. 10 is a view illustrative of the loaded state detecting process in the cassette loading unit of the radiation image information reading apparatus according to the first embodiment.

FIG. 10 shows the smaller cassette 12B loaded into the loading box 50 with the identifier 22 facing the main unit 44, the smaller cassette 12B being positioned closely to the indicators 58a through 58e. In this case, only the sensor S13 (S23, S33, S43, S53) detects the reflective marker 18 if D−DB+m<d5+d4<D−DB+m+K<d5+d4+d3. When the sensor S13 (S23, S33, S43, S53) detects the reflective marker 18, the smaller cassette 12B is detected as being loaded abnormally, and one of the indicators 58a through 58e which corresponds to the position where the smaller cassette 12B is loaded in the loading box 50 is turned on to emit red light, for example, indicating an abnormally loaded state of the smaller cassette 12B.

Figure 11:
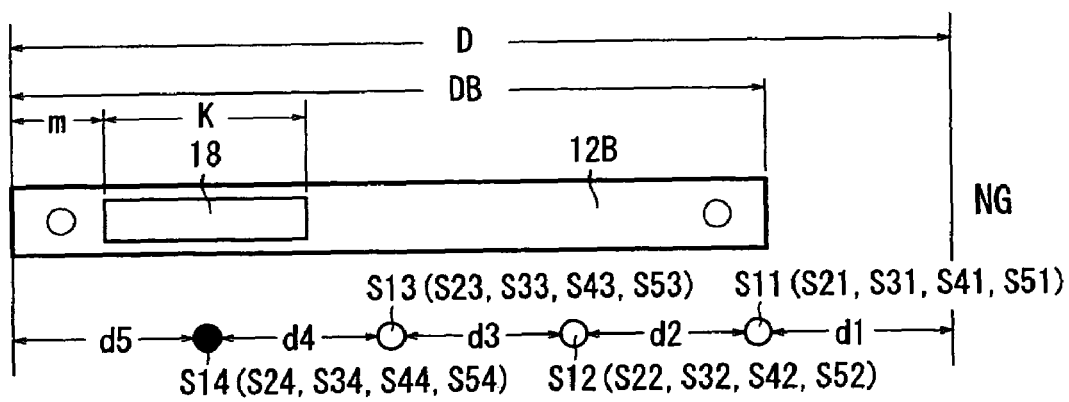
FIG. 11 is a view illustrative of the loaded state detecting process in the cassette loading unit of the radiation image information reading apparatus according to the first embodiment.

FIG. 11 shows the smaller cassette 12B loaded into the loading box 50 with the identifier 22 facing the side wall 51, the smaller cassette 12B being positioned remotely from the indicators 58a through 58e. In this case, only the sensor S14 (S24, S34, S44, S54) detects the reflective marker 18 if m<d5<m+K<d5+d4. When the sensor S14 (S24, S34, S44, S54) detects the reflective marker 18, the smaller cassette 12B is detected as being loaded abnormally, and one of the indicators 58a through 58e which corresponds to the position where the smaller cassette 12B is loaded in the loading box 50 is turned on to emit red light, for example, indicating an abnormally loaded state of the smaller cassette 12B.

If the width K of the reflective marker 18 is set to a width larger than d4 (d4<K) and at least one of the sensor S14 (S24, S34, S44, S54) and the sensor S13 (S23, S33, S43, S53) is arranged to be able to detect the reflective marker 18, then the smaller cassette 12B can reliably be detected as being abnormally loaded in the loading box 50 even when the smaller cassette 12B is loaded in any desired position in the loading box 50. When a cassette 12 is loaded upside down or in a 90°-turned orientation into the loading box 50, since any of the sensors S11 through S54 are unable to detect the reflective marker 18, the cassette 12 is detected as being loaded abnormally.

As described above, the loaded state of a cassette 12 with respect to the cassette loader 38 can be detected. If a cassette 12 is loaded abnormally, then the operator can take a necessary action to correct the loaded state of the cassette 12.

In the above description, the loaded state of a cassette 12 is detected based on whether the sensors S11 through S54 can detect reflected light from the reflective marker 18 or not. However, rather than the reflective marker 18, a bar code representing identification information may be applied to a cassette 12 at a certain location, and the loaded state of the cassette 12 may be detected based on whether a bar-code reader can read the bar code or not. If there are restrictive conditions that require the cassette 12 to be loaded closely to the indicators 58a through 58e, then the bar-code reader may be disposed closely to the indicators 58a through 58e for detecting the loaded state of a cassette 12. Alternatively, if the bar code on a cassette 12 is read by a widely sweeping laser beam, rather than a fixed bar-code reader, then the loaded state of a cassette 12 can be detected even when it is loaded in any position in the loading box 50.

The loaded state of a cassette 12 may also be detected using any of various other sensors such as an RFID (Radio Frequency Identification) sensor, a magnetic sensor, an eddy-current sensor, etc. If one of those sensors is used, then a metal member which does not produce a magnetic field should preferably be provided on cassettes 12 that will be used in the vicinity of patients in order to avoid magnetically induced malfunctions of pacemakers or other medical instruments carried by patients.

Otherwise, a mechanical detector such as a micro switch may be provided on the loading box 50 for being mechanically operated by a recess or the like of a cassette 12. The loaded state of a cassette 12 can be detected by such a detector.

Information representing the loaded state of a cassette 12 which has been thus detected may be supplied to an external device connected to the radiation image information reading apparatus 10, e.g., a terminal device for entering a patient ID to be recorded on the cassette 12, for indicating the processing situation in the radiation image information reading apparatus 10 to the operator.

Then, the lid opening/closing motor 56 is energized to turn the lid 54 into an open position, thus introducing the cassette 12 placed on the lid 54 into the radiation image information reading apparatus 10. Since the bottom panel 52 of the cassette loader 38 is inclined so as to be lower toward the lid 54, the cassettes 12 loaded in the loading box 50 can successively be moved by gravity toward the lid 54 and then introduced into the radiation image information reading apparatus 10. If a cassette 12 is abnormally loaded into the cassette loader 38, the lid opening/closing motor 56 may not open the lid 54 or may keep the lid 54 closed, preventing the abnormally loaded cassette 12 from being introduced into the radiation image information reading apparatus 10.

The cassette 12 that has been introduced into the radiation image information reading apparatus 10 is gripped and fed by the nip rollers 86 to the first processing mechanism 62 that has been waiting in the first processor 70. After the identification information recorded in the identifier 22 is read by the reader 93 of the first processing mechanism 62, the lower end of the cassette 12 is supported by the support members 88a, 88b (see FIG. 5).

If an abnormally loaded cassette 12 is introduced into the radiation image information reading apparatus 10, then the introduced cassette 12 may be judged as being abnormally loaded because the identification information recorded in the identifier 22 cannot be read by the reader 93.

Based on the identification information read by the reader 93, it may be determined whether radiation image information has been recorded in the stimulable phosphor panel 14 stored in the introduced cassette 12, and any fault as to the registered state of the cassette 12 may be known from the determined result.

Then, the pinion gear 94 is rotated to displace the racks 92a, 92b to move the shift plates 96a, 96b toward each other for thereby transversely positioning the cassette 12 supported on the support members 88a, 88b. The transverse position of the cassette 12 is now automatically adjusted in the radiation image information reading apparatus 10 by the shift plates 96a, 96b of the first processing mechanism 62. Therefore, the operator can load cassettes 12 into the cassette loader 38 without paying special attention to the position where they are to be loaded.

After the cassette 12 has been transversely positioned, the support members 88a, 88b are vertically displaced along the joint plates 90a, 90b by a distance based on the size information read by the reader 93, thereby vertically positioning the cassette 12.

After the properly loaded cassette 12 has thus been positioned, the first processing mechanism 62 which is holding the cassette 12 is guided by the guide members 66, 68 to feed the cassette 12 to the second processor 72. Thereafter, the solenoids 100a, 100b mounted on the upper portion of the,first processing mechanism 62 are energized to insert the unlock pins 98a, 98b into the respective holes 34a, 34b of the cassette 12, releasing the locking springs 30a, 30b from the respective holes.34a, 34b. Then, the solenoids 91a, 9ab on the support members 88a, 88b of the first processing mechanism 62 are energized to insert the ejector pins 89a, 89b respectively into the holes 36a, 36b of the cassette 12. As a result, the stimulable phosphor panel 14 is ejected from the cassette 12 through the opening 16 therein.

If the detector 121 positioned above the second processor 72 detects the stimulable phosphor panel 14, then it is judged that the stimulable phosphor panel 14 is properly removed from the cassette 12. If the detector 121 fails to detect the stimulable phosphor panel 14, then it is judged that the mechanism of the cassette 12 or the solenoids 100a, 100b for unlocking the stimulable phosphor panel 14 suffer a failure, and the stimulable phosphor panel 14 cannot be removed from the cassette 12. Information representing the judgement may be indicated to the operator through an external device connected to the radiation image information reading apparatus 10, as is the case with the information representing the loaded state of the cassette 12 into the cassette loader 38.

If the registered state of the cassette 12 is normal and the stimulable phosphor panel 14 is properly removed from the cassette 12, then the nip rollers 119 disposed above the second processor 72 grip the upper end of the stimulable phosphor panel 14 that projects upwardly from the cassette 12, and feed the stimulable phosphor panel 14 through the shutter mechanism 116 into the main unit 44.

The first processing mechanism 62 that is holding the cassette 12, from which the stimulable phosphor panel 14 is ejected into the main unit 44, is guided by the guide members 66, 68 to feed the cassette 12 to the third processor 74 where the second processing mechanism 64 with the grip plates 102a, 102b is waiting. After the grip plates 102a, 102b grip the opposite sides of the cassette 12, the support members 88a, 88b of the first processing mechanism 62 are retracted downwardly, transferring the cassette 12 to the guide members 66, 68.

The second processing mechanism 64 which holds the cassette 12 waits in the third processor 74. The first processing mechanism 62 moves back to the first processor 70 for receiving a next cassette 12 supplied from the cassette loader 38.

The stimulable phosphor panel 14 as it is supplied to the main unit 44 is fed upwardly along the feed path 120 in the auxiliary scanning direction. At the same time, the stimulable phosphor panel 14 is scanned in the main scanning direction by the stimulating light L emitted from the stimulating light scanner 122. Upon exposure to the stimulating light L, the stimulable phosphor panel 14 emits light representing the radiation image information recorded in the stimulable phosphor panel 14. The emitted light is guided by the light guide 124 to the photoelectric transducer 126, which produces an electric signal representative of the recorded radiation image information.

The stimulable phosphor panel 14 from which the radiation image information has been read has its upper and lower portions gripped by the nip rollers 134, 136, and is guided by the guide members 130, 132 and horizontally displaced a predetermined distance by the panel feeder 128. Then, the stimulable phosphor panel 14 is fed downwardly through the shutter mechanism 118 by the nip rollers 134, 136.

The stimulable phosphor panel 14 is delivered into the erasure unit 138 disposed below the shutter mechanism 118. The erasure unit 138 applies erasing light to the stimulable phosphor panel 14 that is being fed downwardly by the nip rollers 140, 142, thus erasing remaining radiation image information from the stimulable phosphor panel 14. The stimulable phosphor panel 14 from which the remaining radiation image information has been erased is stored back through the opening 16 into the cassette 12 that is waiting in the third processor 74.

The cassette 12 with the stimulable phosphor panel 14 stored therein is fed by the second processing mechanism 64 to the fourth processor 76, in which the cassette 12 is gripped by the grip plates 102a, 102b and displaced upwardly. Then, the cassette 12 has its upper end gripped by the nip rollers 106, and is discharged through the lid 108 into the storage box 110 of the cassette unloader 40. Since the bottom panel 112 of the cassette unloader 40 is inclined progressively downwardly away from the lid 108, the discharged cassette 12 moves by gravity and is stacked on a previously discharged cassette 12.

A cassette 12 which has been detected as being abnormally loaded in the cassette loader 38, a cassette 12 which has been detected as being abnormally registered by the reader 93 of the first processor 70, or a cassette 12 from which the stimulable phosphor panel 14 has been detected as being not removed properly by the detector 121 disposed above the second processor 72 is fed by the second processing mechanism 64 of the cassette feeder 42 through the third processor 74 and the fourth processor 76 to the fifth processor 77. Then, the cassette 12 has its upper end gripped by the nip rollers 107, and is discharged through the lid 109 into the storage box 111 of the cassette storage unit 41. Since the bottom panel 113 of the cassette storage unit 41 is also inclined progressively downwardly away from the lid 109, the discharged cassette 12 moves by gravity and is stacked on a previously discharged cassette 12.

The operator can correct the loaded state of the cassette 12 discharged into the cassette storage unit 41 or repair a fault of the cassette 12 or the stimulable phosphor panel 14 in the cassette storage unit 41 at a desired time, and can load the cassette 12 into the cassette loader 38 for further processing operation. During this time, the radiation image information reading apparatus 10 can continuously process cassettes 12 in a normal state uninterruptedly.

Figure 12:
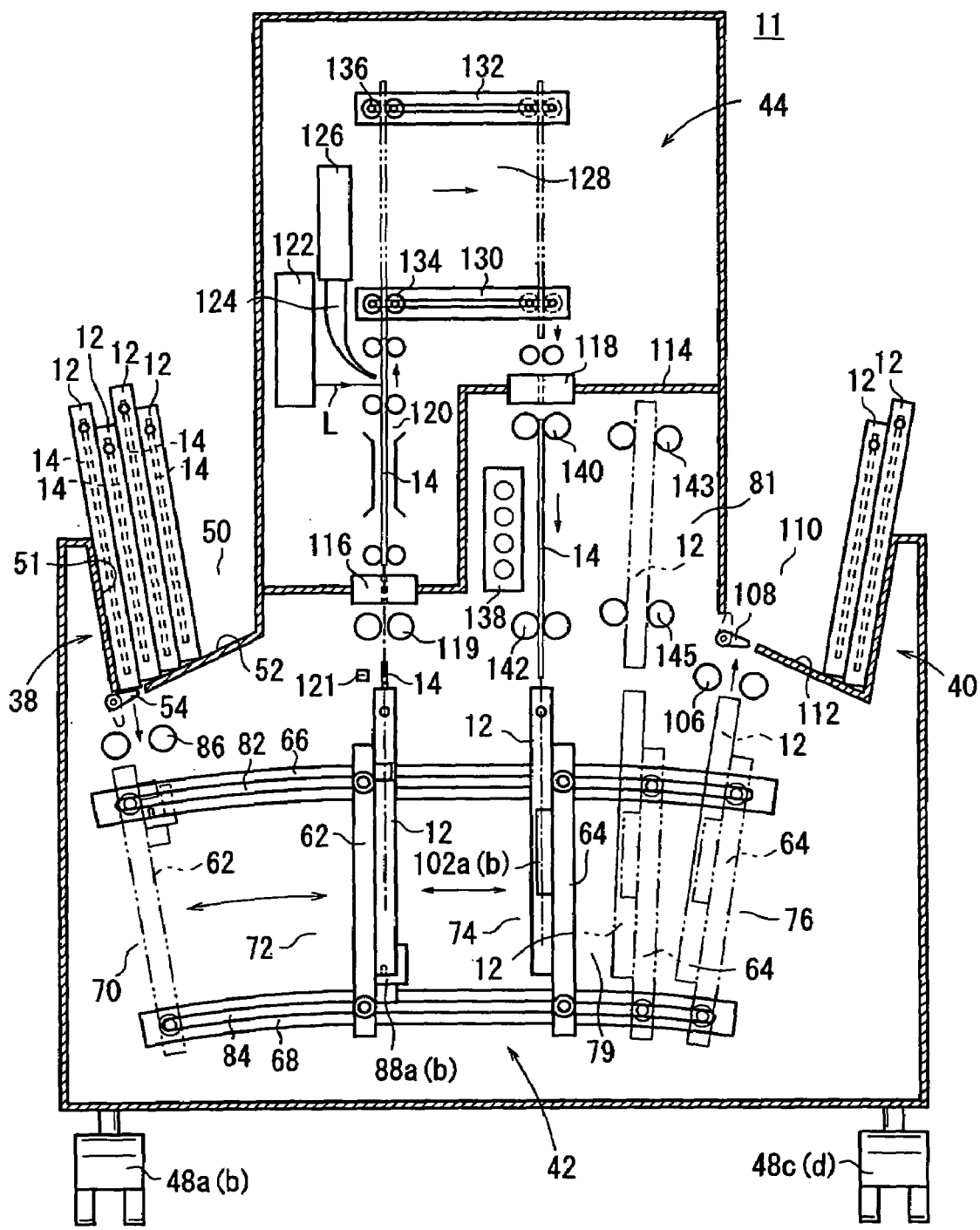
FIG. 12 is a vertical cross-sectional view of a modification, which incorporates a different cassette storage unit, of the radiation image information reading apparatus according to the first embodiment.

The radiation image information reading apparatus 10 according to the above embodiment discharges a cassette 12 which has been detected as being in an abnormal state into the cassette storage unit 41 disposed outside of the radiation image information reading apparatus 10. However, as shown in FIG. 12, a cassette 12 which has been detected as being in an abnormal state may be stored within a radiation image information reading apparatus 11.

Specifically, the radiation image information reading apparatus 11 has a cassette feeder 42 having a fifth processor 79 disposed between the third processor 74 and the forth processor 76, and a cassette storage unit 81 disposed in a space above the fifth processor 79 for storing a cassette 12 that has been detected as being in an abnormal state. The cassette storage unit 81 has two pairs of nip rollers 143, 145 for gripping and feeding a cassette 12.

With the radiation image information reading apparatus 11, a cassette 12 that has been detected as being in an abnormal state is not discharged out of the radiation image information reading apparatus 11, but is fed to the fifth processor 79, and then fed to and stored in the cassette storage unit 81 disposed above the fifth processor 79 by the nip rollers 143, 145.

The operator can recognize that a cassette 12 in an abnormal state is stored in the cassette storage unit 81 based on information representative of the abnormal state which is obtained from the sensors S11 through S54 of the cassette loader 38, the reader 93 of the first processor 70, or the detector 121 disposed above the second processor 72. Therefore, after a cassette 12 in a normal state has been processed, for example, the cassette 12 stored in the cassette storage unit 81 may be fed to the fifth processor 79, then unloaded from the fourth processor 76 into the cassette unloader 40, and thereafter corrected as desired based on an instruction from the operator.

Figure 13:
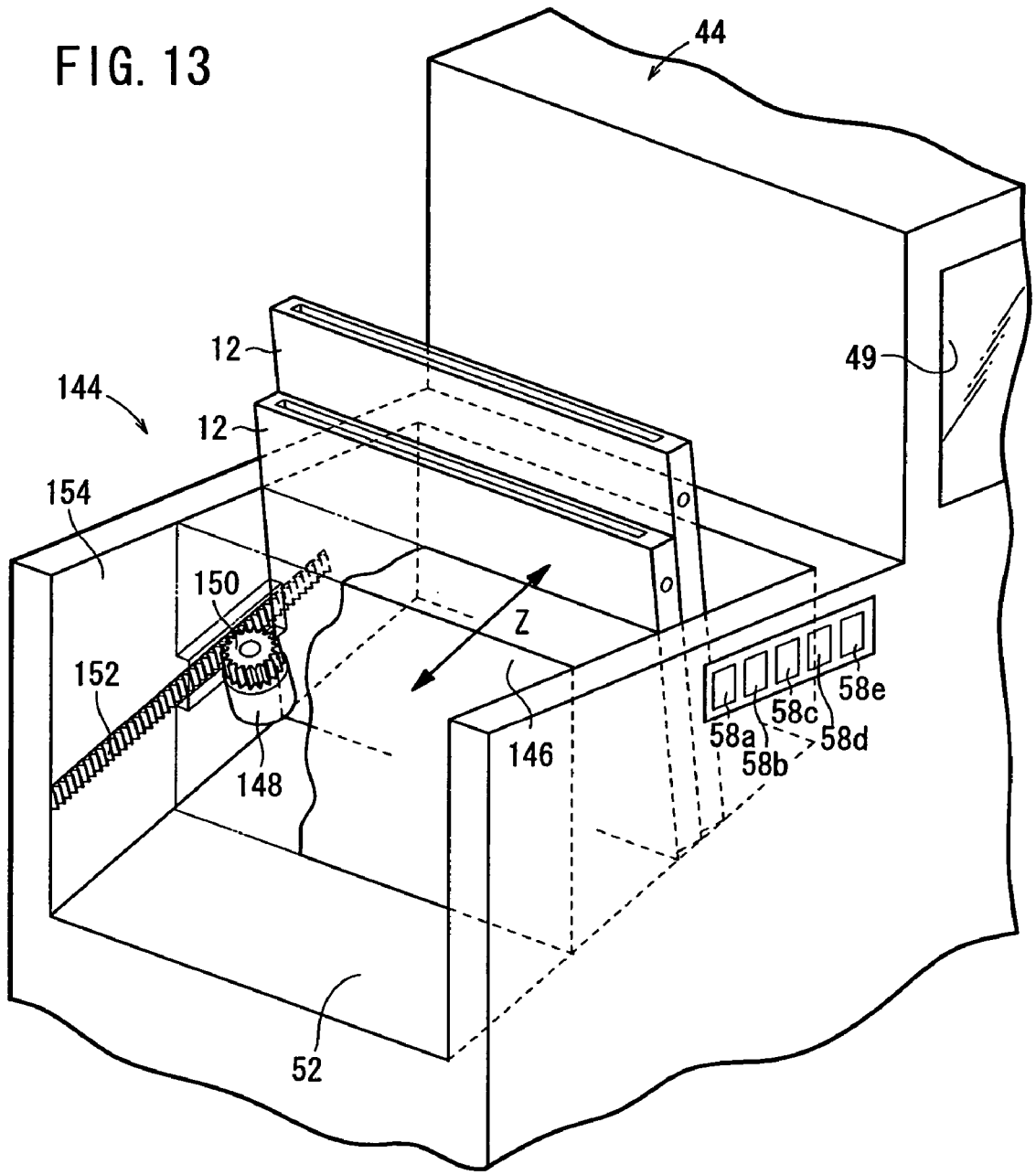
FIG. 13 is a fragmentary perspective view, partly broken away, of a modification, which incorporates a different cassette storage unit, of the radiation image information reading apparatus according to the first embodiment.

Rather than storing a cassette 12 in an abnormal state in the cassette storage unit 41 (FIG. 2) or the cassette storage unit 81 (FIG. 12), it may be retracted into a given region in a cassette loader 144 which is constructed as shown in FIG. 13, and only a cassette 12 that is in a normally loaded or normally registered state may be introduced from the cassette loader 144 into the radiation image information reading apparatus 10 for continued processing. Readers for reading identification information recorded in the identifiers 20, 22 of cassettes 12 are disposed in the cassette loader 144 for detecting whether those cassettes 12 are in a normally registered state or not.

Specifically, a motor 148 having a pinion gear 150 is mounted on a movable wall 146 of the cassette loader 144, and a rack 152 held in mesh with the pinion gear 150 is mounted on a side wall 154 of the cassette loader 144.

Figure 14:
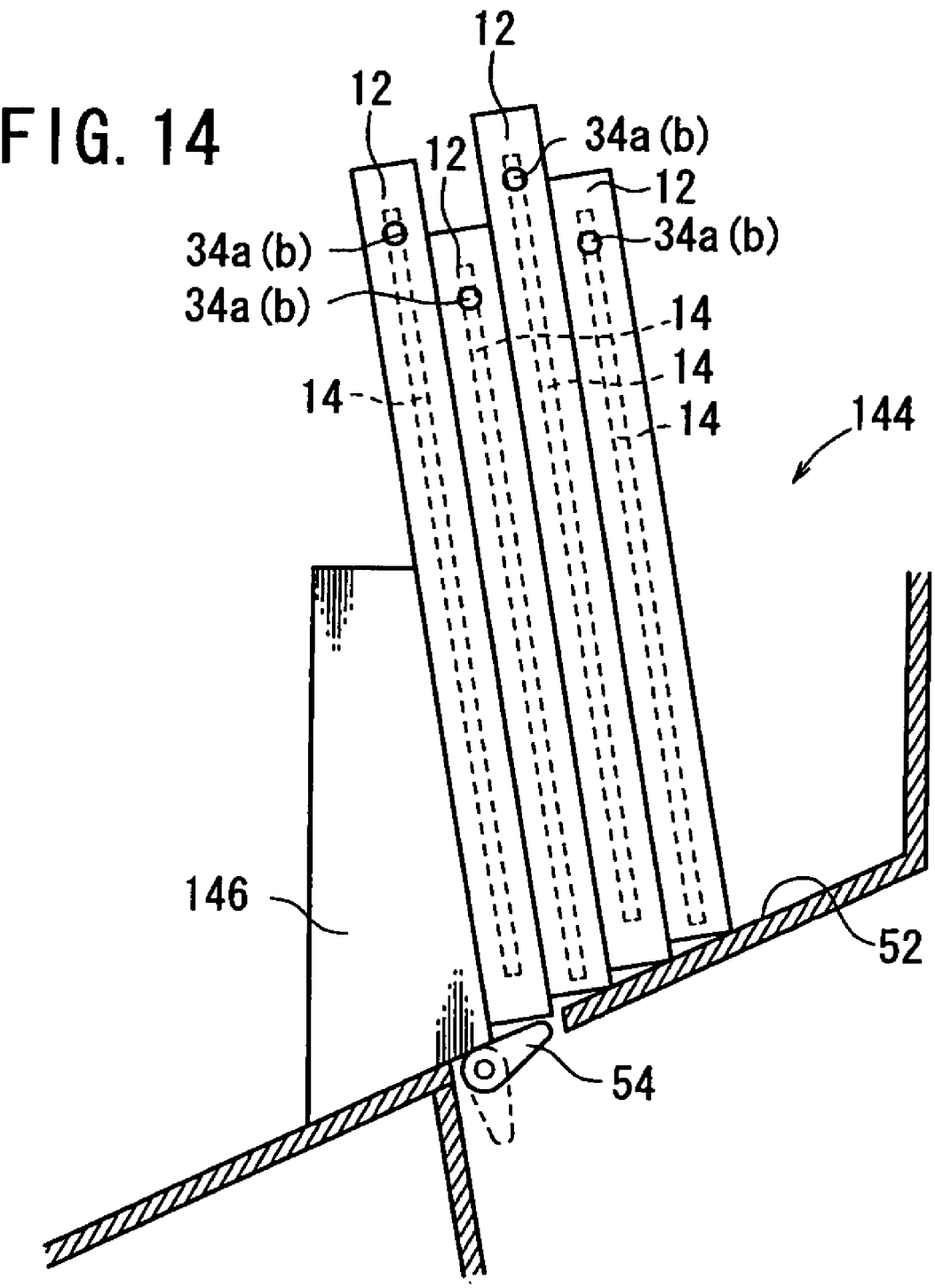
FIG. 14 is a vertical cross-sectional view showing the manner in which a cassette loading unit of the radiation image information reading apparatus shown in FIG. 13 operates.
Figure 15:
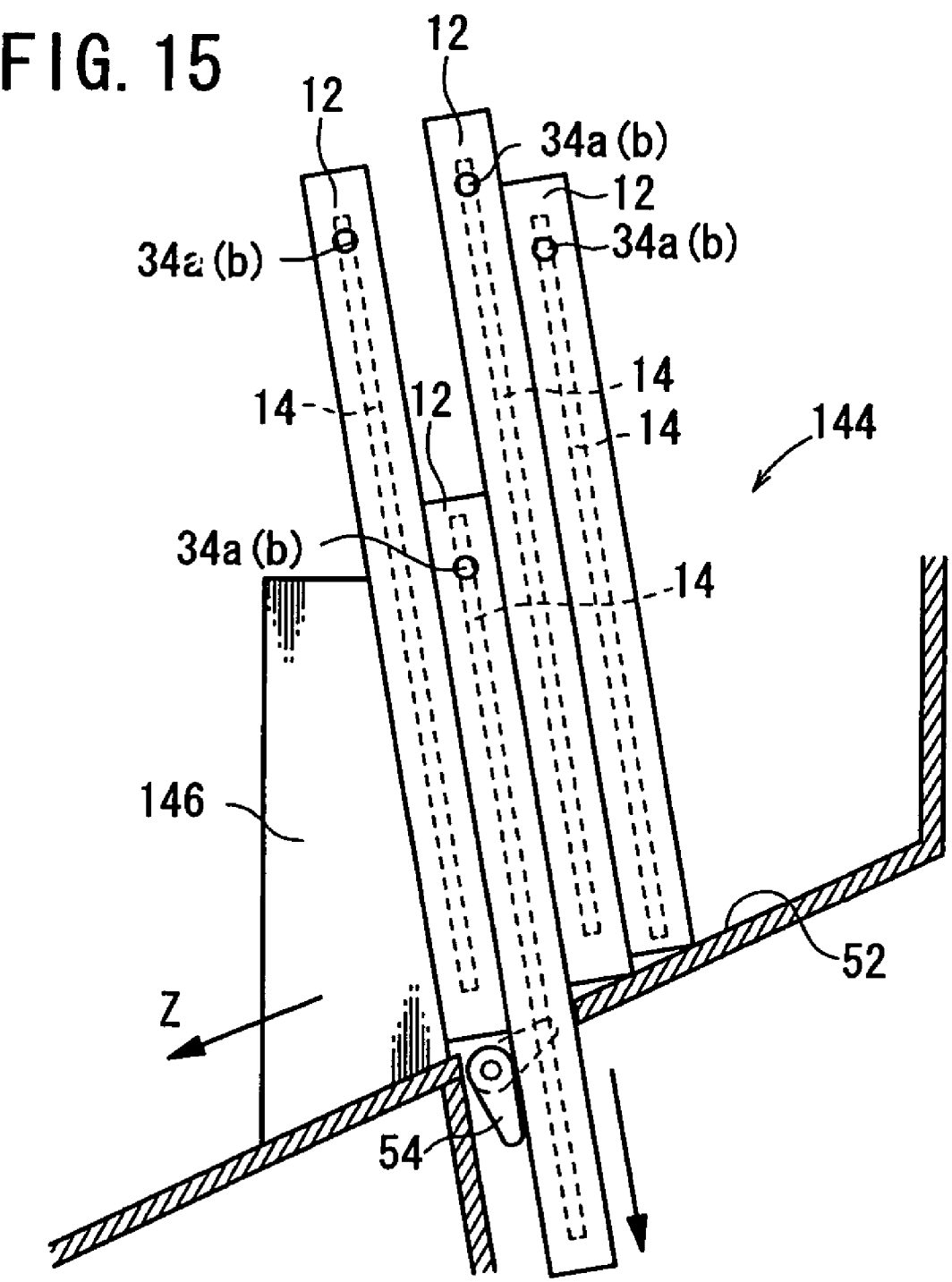
FIG. 15 is a vertical cross-sectional view showing the manner in which the cassette loading unit of the radiation image information reading apparatus shown in FIG. 13 operates.

As shown in FIG. 14, the loaded state of a cassette 12 that is positioned on the lid 54 of the cassette loader 144 is detected by the sensors S11 through S14 (see FIG. 4). If the loaded state of the cassette 12 is detected as being abnormal, then the movable wall 146 is displaced in the direction indicated by the arrow Z (see FIG. 15) away from the main unit 44 by a distance equal to the thickness of one cassette 12. Then, the loaded state of a next cassette 12 that is positioned on the lid 54 is detected by the sensors S11 through S14. If the loaded state of the cassette 12 is detected as being normal, then the lid 54 is opened to introduce the normally loaded cassette 12 from the cassette loader 144 into the radiation image information reading apparatus 10. Cassettes 12 that are in normally and abnormally registered states are also handled in the same manner.

Therefore, a cassette 12 that is in an abnormally loaded or registered state is retracted by gravity into a given region on the inclined bottom panel 52 of the cassette loader 144 which is defined by the movable wall 146 and spaced remotely from the main unit 44, and a cassette 12 that is in a normally loaded or registered state is introduced into the radiation image information reading apparatus 10 and processed therein.

The movable wall 146 may have a mechanism for engaging and holding a cassette 12 which has been detected as being in an abnormally loaded or registered state. Since a cassette 12 which has been detected as being in an abnormally loaded or registered state can be held by the mechanism and retracted into the given region when the movable wall 146 is displaced, the bottom panel 52 of the cassette loader 144 does not need to be inclined.

Figure 16:
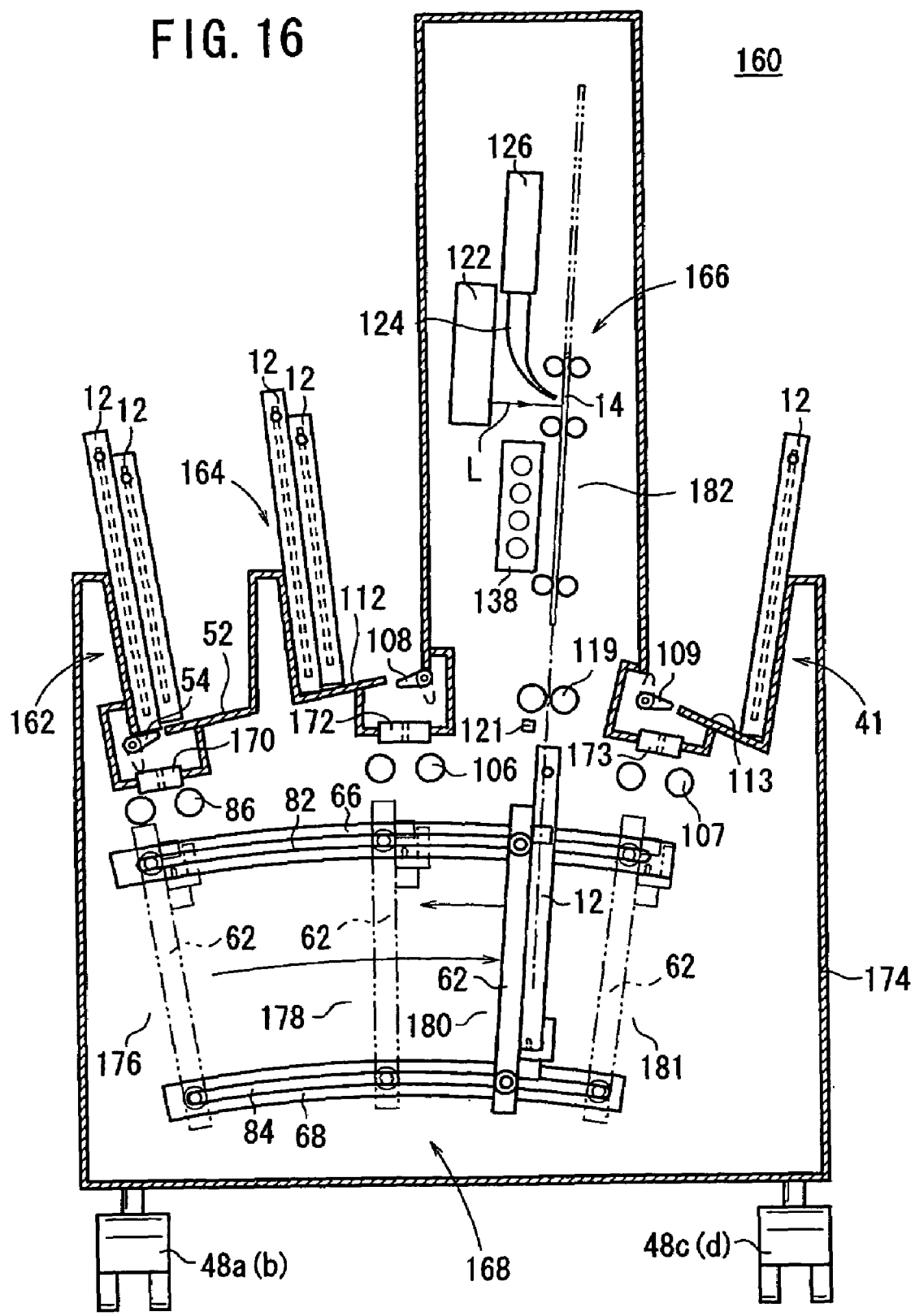
FIG. 16 is a vertical cross-sectional view of a radiation image information reading apparatus according to a second embodiment of the present invention.

FIG. 16 shows in vertical cross section a radiation image information reading apparatus 160 according to a second embodiment of the present invention. Those parts of the radiation image information reading apparatus 160 which are identical to those of the radiation image information reading apparatus 10 are denoted by identical reference characters, and will not be described in detail below.

The radiation image information reading apparatus 160 comprises a cassette loader 162 for loading a plurality of cassettes 12, a cassette unloader 164 for unloading a plurality of cassettes 12 which have been processed in a normal state, a cassette storage unit 41 for storing a cassette 12 that has been detected as in an abnormal state, a main unit 166 for reading recorded radiation image information from the stimulable phosphor panel 14 ejected from a cassette 12 and erasing remaining radiation image information from the stimulable phosphor panel 14, and a cassette feeder 168 for feeding a cassette 12 below the cassette loader 162, the cassette unloader 164, the main unit 166, and the cassette storage unit 41.

The cassette loader 162 and the cassette unloader 164 are positioned forward of the main unit 166. The cassette storage unit 41 is disposed rearward of the main unit 166. The radiation image information reading apparatus 160 also has shutter mechanisms 170, 172, 173 combined respectively with the cassette loader 162, the cassette unloader 164, and the cassette storage unit 41 for shielding the interior of a casing 174 which supports and encloses the components of the radiation image information reading apparatus 160 against entry of light.

The cassette feeder 168 has a first processing mechanism 62 movable along the guide members 66, 68 between a first processor 176, a second processor 178, a third processor 180, and a fourth processor 181. The first processor 176 is disposed below the cassette loader 162. The second processor 178 is disposed below the cassette unloader 164. The third processor 180 is disposed below the main unit 166. The fourth processor 181 is disposed below the cassette storage unit 41. A linear reading feed path 182 extending substantially upwardly is disposed in the main unit 166. The erasure unit 138, the stimulating light scanner 122, the light guide 124, and the photoelectric transducer 126 are successively disposed along the feed path 182.

The radiation image information reading apparatus. 160 according to the second embodiment is basically constructed as described above. Operation of the radiation image information reading apparatus 160 will be described below.

When the operator loads a plurality of cassettes 12 into the cassette loader 162, the sensors S11 through S54 (see FIG. 4) detect respective loaded states of the cassettes 12. The indicators 58a through 58e on the side wall of the cassette loader 162 indicate the loaded states of the respective cassettes 12 which have been detected.

Then, a cassette 12 is supplied from the cassette loader 162 to the first processor 176 of the cassette feeder 168, and then fed to the third processor 180 by the first processing mechanism 62.

If the cassette 12 is fed to the third processor 180 in normally loaded and registered states and if a stimulable phosphor panel 14 is removed from the cassette 12 in a normally ejected state, then the stimulable phosphor panel 14 is supplied to the feed path 182 in the main unit 166 by nip rollers 119. While the stimulable phosphor panel 14 is being fed upwardly in the auxiliary scanning direction, it is scanned in the main scanning direction by a stimulating light beam L emitted from the stimulating light scanner 122. Upon exposure to the stimulating light beam L, the stimulable phosphor panel 14 emits light that is guided by the light guide 124 to the photoelectric transducer 126, which converts the light into an electric signal representative of the radiation image information recorded in the stimulable phosphor panel 14.

After the radiation image information has been read from the stimulable phosphor panel 14, the stimulable phosphor panel 14 is fed downwardly along the feed path 182 to the erasure unit 138, which applies erasure light to the stimulable phosphor panel 14 to erase remaining radiation image information from the stimulable phosphor panel 14.

The stimulable phosphor panel 14 from which the remaining radiation image information has been erased is stored back into the cassette 12 that is waiting in the third processor 180. Thereafter, the stimulable phosphor panel 14 is unloaded from the second processor 178 through the shutter mechanism 172 into the cassette unloader 164.

A cassette 12 that is detected as being in an abnormally loaded state by the cassette loader 162, or a cassette 12 that is detected as being in an abnormally registered state by the first processor 176, or a cassette 12 that is detected as failing to eject the stimulable phosphor panel 14 normally by the detector 121 in the third processor 180 is fed to the fourth processor 181 by the cassette feeder 168. The cassette 12 that is fed to the fourth processor 181 has its upper end gripped by the nip rollers 107, and is discharged as a cassette 12 in an abnormal state through the shutter mechanism 173 and the lid 109 into the cassette storage unit 41.

Figure 17:
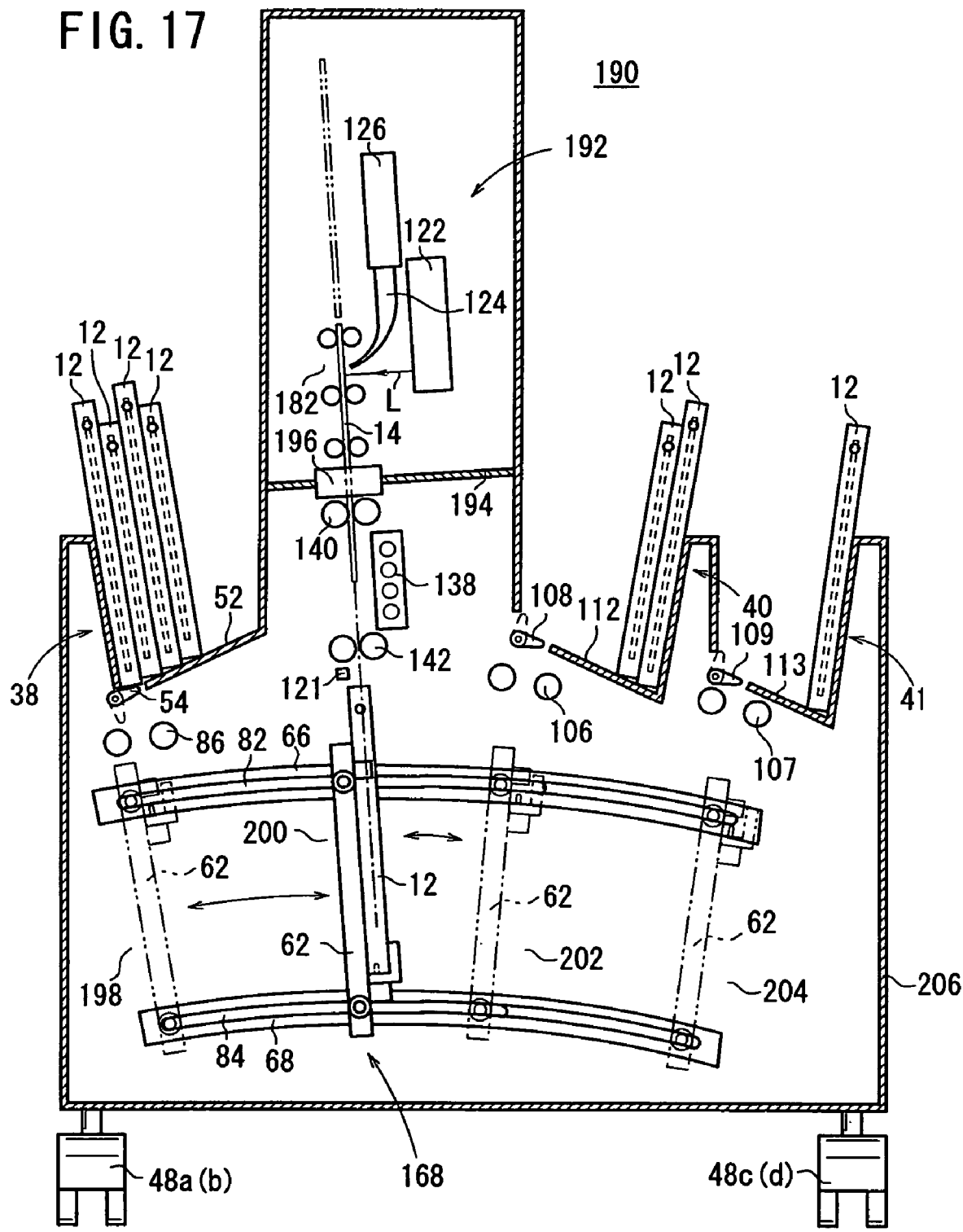
FIG. 17 is a vertical cross-sectional view of a radiation image information reading apparatus according to a third embodiment of the present invention.

FIG. 17 shows in vertical cross section a radiation image information reading apparatus 190 according to a third embodiment of the present invention. Those parts of the radiation image information reading apparatus 190 which are identical to those of the radiation image information reading apparatus 10 or 160 are denoted by identical reference characters, and will not be described in detail below.

The radiation image information reading apparatus 190 has a main unit 192, a cassette loader 38 disposed forward of the main unit 192 for loading a plurality of cassettes 12, a cassette unloader 40 disposed rearward of the main unit 192 for unloading a plurality of cassettes 12, a cassette storage unit 41 disposed adjacent to the cassette unloader 40 for storing a cassette 12 that has been detected as in an abnormal state, and a cassette feeder 168 feeding a cassette 12 between a first processor 198, a second processor 200, a third processor 202, and a fourth processor 204.

The first processor 198 is disposed below the cassette loader 38. The second processor 200 is disposed below the main unit 192. The third processor 202 is disposed below the cassette unloader 40. The fourth processor 204 is disposed below the cassette storage unit 41. The main unit 192 is held in a light-shielded condition by a casing 206 of the radiation image information reading apparatus 190 and a partition wall 194 having a shutter mechanism 196. The erasure unit 138 is disposed between the shutter mechanism 196 and the second processor 200.

The radiation image information reading apparatus 190 according to the third embodiment is basically constructed as described above. Operation of the radiation image information reading apparatus 190 will be described below.

When the operator loads a plurality of cassettes 12 into the cassette loader 38, the sensors S11 through S54 (see FIG. 4) detect respective loaded states of the cassettes 12. The indicators 58a through 58e on the side wall of the cassette loader 162 indicate the loaded states of the respective cassettes 12 which have been detected.

A cassette 12 that is supplied from the cassette loader 38 to the first processor 198 of the cassette feeder 168 is detected for its registered state, and is thereafter fed to the second processor 200 by the first processing mechanism 62.

If the cassette 12 is fed to the second processor 200 in normally loaded and registered states and if a stimulable phosphor panel 14 is removed from the cassette 12 in a normally ejected state, then the stimulable phosphor panel 14 is supplied to the main unit 192 by nip rollers 142, 140 and the shutter mechanism 196. After the stimulable phosphor panel 14 is fed upwardly along the feed path 182 into an upper portion of the main unit 192, the stimulable phosphor panel 14 is fed downwardly during which time the radiation image information recorded therein is read. After the radiation image information has been read from the stimulable phosphor panel 14, the stimulable phosphor panel 14 is fed downwardly along the feed path 182 through the shutter mechanism 196 to the erasure unit 138, which applies erasure light to the stimulable phosphor panel 14 to erase remaining radiation image information from the stimulable phosphor panel 14. Therefore, when the radiation image information is read from the stimulable phosphor panel 14 by the photoelectric transducer 126, remaining radiation image information is simultaneously erased from the stimulable phosphor panel 14 by the erasure unit 138.

The cassette 12 has been waiting in the second processor 200 disposed below the erasure unit 138. When the stimulable phosphor panel 14 from which the radiation image information is read and the remaining radiation image information is erased is inserted into the cassette 12 in the second processor 200, the first processing mechanism 62 is moved to the third processor 202, and the cassette 12 is unloaded into the cassette unloader 40.

A cassette 12 that is detected as being in an abnormally loaded or registered state and fed to the second processor 200, or a cassette 12 that is detected as failing to eject the stimulable phosphor panel 14 normally by the detector 121 in the second processor 200 is fed to the fourth processor 204 by the cassette feeder 168. The cassette 12 that is fed to the fourth processor 204 has its upper end gripped by the nip rollers 107, and is discharged as a cassette 12 in an abnormal state through the lid 109 into the cassette storage unit 41.

Figure 18:
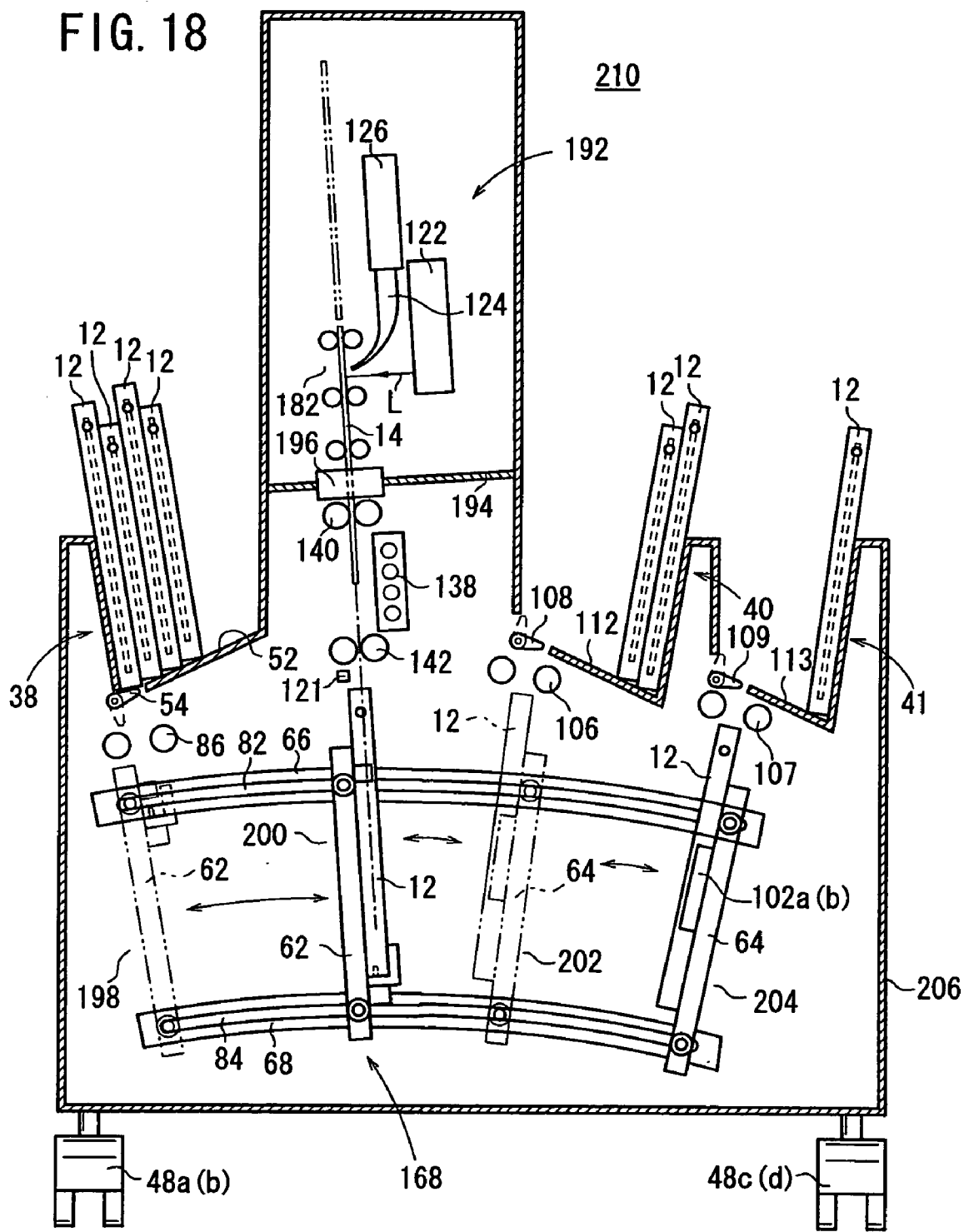
FIG. 18 is a vertical cross-sectional view of a radiation image information reading apparatus according to a fourth embodiment of the present invention.

FIG. 18 shows in vertical cross section a radiation image information reading apparatus 210 according to a fourth embodiment of the present invention. Those parts of the radiation image information reading apparatus 210 which are identical to those of the radiation image information reading apparatus 190 are denoted by identical reference characters, and will not be described in detail below.

The radiation image information reading apparatus 210 has a cassette feeder 168 comprising a first processing mechanism 62 for feeding a cassette 12 from the first processor 198 to the second processor 200, and a second processing mechanism 64 for feeding a cassette 12 from the second processor 200 via the third processor 202 to the fourth processor 204.

The first processing mechanism 62 detects the registered state of a cassette 12 that has been judged as being in a normally loaded state and supplied from the cassette loader 38. Thereafter, the first processing mechanism 62 feeds the cassette 12 that has been detected as being in a normally registered state from the first processor 198 to the second processor 200, from which the stimulable phosphor panel 14 normally ejected from the cassette 12 is supplied to the main unit 192. The cassette 12 which has supplied the stimulable phosphor panel 14 to the main unit 192 is transferred from the first processing mechanism 62 to the second processing mechanism 64, and waits in the second processor 200. The first processing mechanism 62 moves back to the first processor 198 for receiving a next cassette 12.

The stimulable phosphor panel 14 that has been processed by the main unit 192 is delivered to the erasure unit 138, which erases remaining radiation image information from the stimulable phosphor panel 14. The stimulable phosphor panel 14 is then stored back into the cassette 12 that has been waiting in the second processor 200. Then, the stimulable phosphor panel 14 is moved by the second processing mechanism 64 to the third processor 202, from which it is unloaded into the cassette unloader 40.

A cassette 12 that is detected as being in an abnormally loaded state by the cassette loader 38, or a cassette that is detected as being in an abnormally registered state by the first processor 198, or a cassette 12 that is detected as failing to eject the stimulable phosphor panel 14 normally by the detector 121 in the second processor 200 is fed by the second processing mechanism 64 to the fourth processor 204, from which the cassette 12 is discharged into the cassette storage unit 41.

As described above, with the radiation image information reading apparatus 210 according to the fourth embodiment, the process of the first processing mechanism 62 to receive a cassette 12 from the cassette loader 38 and supply the cassette 12 to the main unit 192, and the process of the second processing mechanism 64 to unload a cassette 12 into the cassette unloader 40 or discharge a cassette 12 into the cassette storage unit 41 can efficiently be carried out concurrent with each other.

In the radiation image information reading apparatus 160, 190, 210, the cassette storage unit 41 may be dispensed with, and the cassette loaders 38, 162 may be constructed as the cassette loader 144 shown in FIG. 13 for storing a cassette 12 that has been detected as being in an abnormal state.

In each of the above embodiments, the cassette 12 has the opening 16 defined in one end thereof and the stimulable phosphor panel 14 is taken through the opening 16 into and out of the cassette 12. However, the present invention is also applicable to a cassette that is constructed to allow a stimulable phosphor panel 14 to be taken into and out of the cassette by opening and closing a lid, or a unitary cassette having a protective cover that detachably covers the recording surface of a stimulable phosphor panel 14 for recording radiation image information.

The stimulable phosphor panel 14 that can be stored in cassettes 12 is not limited to a stimulable phosphor sheet comprising the support base 26 made of a hard material and the stimulable phosphor layer 28 disposed on the support base 26, but may be a stimulable phosphor panel comprising a flexible support base coated with a stimulable phosphor.

In each of the above embodiments, the bottom panels 52 of the cassette loaders 38, 144, 162, the bottom panel 112 of the cassette unloaders 40, 164, and the bottom panel 113 of the cassette storage unit 41 are inclined to cause cassettes 12 to move by gravity into a predetermined region. However, cassettes 12 may be moved by a cassette moving mechanism combined with the cassette loader, the cassette unloader, and the cassette storage unit.

For example, in the cassette loaders 38, 144, 162, a movable wall may be moved toward the lid 54 by an actuator such as a motor or the like or a resilient member such as a spring or the like for moving cassettes 12 successively toward the lid 54. In the cassette unloaders 40, 164 and the cassette storage unit 41, a movable wall may be moved by an actuator such as a motor or the like for moving cassettes 12 that have been discharged through the lids 108, 109 successively toward a predetermined region. With these arrangements, cassettes 12 can be moved to the predetermined region without the bottom panels 52, 112, 113 being inclined.

Although certain preferred embodiments of the present invention have been shown and described in detail, it should be understood that various changes and modifications may be made therein without departing from the scope of the appended claims.

What is claimed is:

1. A radiation image information reading apparatus comprising:
    a cassette loader for loading a plurality of cassettes each storing a stimulable phosphor panel with radiation image information recorded therein;
    a reading unit for applying stimulating light to said stimulable phosphor panel and photoelectrically reading light emitted from said stimulable phosphor panel to acquire the radiation image information recorded in the stimulable phosphor panel;
    an erasure unit for applying erasing light to said stimulable phosphor panel to erase remaining radiation image information from the stimulable phosphor panel;
    a detector for detecting a state of a cassette;
    an abnormal cassette storage unit for storing a cassette which is detected by said detector as being in an abnormal state;
    a normal cassette storage unit which stores a cassette including a stimulable phosphor panel from which radiation image information has been read by said reading unit; and
    a discharging mechanism for discharging the cassette detected as being in the abnormal state into said abnormal cassette storage unit.

2. A radiation image information reading apparatus according to claim 1, wherein said detector detects a loaded state of a cassette which is loaded in said cassette loader.

3. A radiation image information reading apparatus according to claim 2, wherein said detector detects the loaded state of the cassette based on a detected state of a reflective marker disposed in a predetermined position on the cassette.

4. A radiation image information reading apparatus according to claim 1, wherein said detector detects a registered state of a cassette which is loaded in said cassette loader.

5. A radiation image information reading apparatus according to claim 4, wherein said detector detects the registered state of the cassette based on identification information detected from an identification information detecting means disposed in a predetermined position on the cassette.

6. A radiation image information reading apparatus according to claim 1, wherein said detector detects an ejected state of said stimulable phosphor panel stored in a cassette.

7. A radiation image information reading apparatus according to claim 1, wherein said abnormal cassette storage unit is disposed in said cassette loader.

8. A radiation image information reading apparatus according to claim 7, wherein said cassette loader has an inlet member for introducing a cassette into the radiation image information reading apparatus, and a wall movable from said inlet member to provide said abnormal cassette storage unit, and wherein said wall serves as said discharging mechanism, holds the cassette detected as being in the abnormal state, and moves to store the cassette into said abnormal cassette storage unit.

9. A radiation image information reading apparatus according to claim 8, wherein said inlet member is disposed on an inclined bottom panel of said cassette loader, and said wall is movable downwardly from said inlet member along said inclined bottom panel, and wherein said wall moves downwardly along said inclined bottom panel together with the cassette detected as being in the abnormal state to store the cassette into said abnormal cassette storage unit.

10. A radiation image information reading apparatus according to claim 1, wherein said abnormal cassette storage unit is disposed within the radiation image information reading apparatus, for storing a cassette that is detected as being in an abnormal state which is introduced from said cassette loader into the radiation image information reading apparatus and discharged by said discharging mechanism.

11. A radiation image information reading apparatus according to claim 1, wherein said abnormal cassette storage unit is disposed outside of the radiation image information reading apparatus independently of said cassette loader, for storing a cassette that is detected as being in an abnormal state which is introduced from said cassette loader into the radiation image information reading apparatus and discharged by said discharging mechanism.

12. A radiation image information reading apparatus according to claim 1, further comprising: wherein said normal cassette storage unit stores a cassette, which is not detected as being in an abnormal state and includes a stimulable phosphor panel from which radiation image information has been read by said reading unit and from which remaining radiation image information has been erased by said erasure unit;
    wherein said discharging mechanism selects said abnormal cassette storage unit or said normal cassette storage unit depending on the state of said cassette, and discharges the cassette.

13. A radiation image information reading apparatus comprising:
    a cassette loader for loading a plurality of cassettes each storing a stimulable phosphor panel with radiation image information recorded therein;
    a reading unit for applying stimulating light to said stimulable phosphor panel and photoelectrically reading light emitted from said stimulable phosphor panel to acquire the radiation image information recorded in the stimulable phosphor panel;
    an erasure unit for applying erasing light to said stimulable phosphor panel to erase remaining radiation image information from the stimulable phosphor panel;
    a detector for detecting a state of a cassette;
    an abnormal cassette storage unit for storing a cassette which is detected by said detector as being in an abnormal state; and
    a discharging mechanism for discharging the cassette detected as being in the abnormal state into said abnormal cassette storage unit,
    wherein said cassette loader has an inlet member for introducing a cassette into the radiation image information reading apparatus, and a wall movable from said inlet member to provide said abnormal cassette storage unit, and wherein said wall serves as said discharging mechanism, holds the cassette detected as being in the abnormal state, and moves to store the cassette into said abnormal cassette storage unit.

14. A radiation image information reading apparatus according to claim 13, wherein said inlet member is disposed on an inclined bottom panel of said cassette loader, and said wall is movable downwardly from said inlet member along said inclined bottom panel, and wherein said wall moves downwardly along said inclined bottom panel together with the cassette detected as being in the abnormal state to store the cassette into said abnormal cassette storage unit.

15. A radiation image information reading apparatus comprising:
- a cassette loader for loading a plurality of cassettes each storing a stimulable phosphor panel with radiation image information recorded therein;
- a reading unit for applying stimulating light to said stimulable phosphor panel and photoelectrically reading light emitted from said stimulable phosphor panel to acquire the radiation, image information recorded in the stimulable phosphor panel;
- an erasure unit for applying erasing light to said stimulable phosphor panel to erase remaining radiation image information from the stimulable phosphor panel;
- a detector for detecting a state of a cassette;
- an abnormal cassette storage unit for storing a cassette which is detected by said detector as being in an abnormal state; and
- a discharging mechanism for discharging the cassette detected as being in the abnormal state into said abnormal cassette storage unit,
- wherein said abnormal cassette storage unit is disposed within the radiation image information reading apparatus, for storing a cassette that is detected as being in an abnormal state which is introduced from said cassette loader into the radiation image information reading apparatus and discharged by said discharging mechanism.

16. A radiation image information reading apparatus comprising:
- a cassette loader for loading a plurality of cassettes each storing a stimulable phosphor panel with radiation image information recorded therein;
- a reading unit for applying stimulating light to said stimulable phosphor panel and photoelectrically reading light emitted from said stimulable phosphor panel to acquire the radiation image information recorded in the stimulable phosphor panel;
- an erasure unit for applying erasing light to said stimulable phosphor panel to erase remaining radiation image information from the stimulable phosphor panel;
- a detector for detecting a state of a cassette;
- an abnormal cassette storage unit for storing a cassette which is detected by said detector as being in an abnormal state; and
- a discharging mechanism for discharging the cassette detected as being in the abnormal state into said abnormal cassette storage unit,
- wherein said detector detects a loaded state of a cassette which is loaded in said cassette loader, and
- wherein said detector detects the loaded state of the cassette based on a detected state of a reflective marker disposed in a predetermined position on the cassette.

* * * * *